US009420548B2

(12) United States Patent
Teague

(10) Patent No.: US 9,420,548 B2
(45) Date of Patent: Aug. 16, 2016

(54) DYNAMIC IOT SETPOINTS AND INTERFERENCE CONTROL

(75) Inventor: Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1221 days.

(21) Appl. No.: 12/183,957

(22) Filed: Jul. 31, 2008

(65) Prior Publication Data
US 2010/0029211 A1 Feb. 4, 2010

(51) Int. Cl.
H04B 1/00 (2006.01)
H04W 52/24 (2009.01)
H04W 72/08 (2009.01)
H04B 17/345 (2015.01)

(52) U.S. Cl.
CPC ........... *H04W 52/243* (2013.01); *H04B 17/345* (2015.01); *H04W 72/082* (2013.01)

(58) Field of Classification Search
USPC .............. 455/67.11, 67.13, 63.1, 450, 456.1, 455/522, 69; 370/329; 375/346
See application file for complete search history.

(56) References Cited

U.S. PATENT DOCUMENTS

| | | | | |
|---|---|---|---|---|
| 5,839,056 A * | 11/1998 | Hakkinen | | 455/69 |
| 6,301,478 B1 * | 10/2001 | Wallstedt et al. | | 455/436 |
| 6,603,745 B1 * | 8/2003 | Antonio et al. | | 370/318 |
| 6,628,956 B2 * | 9/2003 | Bark et al. | | 455/522 |
| 6,968,201 B1 * | 11/2005 | Gandhi et al. | | 455/522 |
| 7,636,322 B1 * | 12/2009 | Gandhi et al. | | 370/252 |
| 2002/0077138 A1 * | 6/2002 | Bark et al. | | 455/522 |
| 2002/0107021 A1 * | 8/2002 | Ishikawa et al. | | 455/436 |
| 2003/0039217 A1 * | 2/2003 | Seo et al. | | 370/318 |
| 2004/0010286 A1 | 1/2004 | Gieringer | | |
| 2004/0120286 A1 * | 6/2004 | Schwarz | | 370/331 |
| 2004/0203857 A1 * | 10/2004 | Wang | | 455/456.1 |
| 2004/0219920 A1 * | 11/2004 | Love et al. | | 455/442 |
| 2004/0223507 A1 * | 11/2004 | Kuchibhotla et al. | | 370/428 |

(Continued)

FOREIGN PATENT DOCUMENTS

| | | |
|---|---|---|
| CN | 1370022 A | 9/2002 |
| JP | 2008092545 A | 4/2008 |
| WO | 2006099547 A1 | 9/2006 |

OTHER PUBLICATIONS

International Search Report and Written Opinion—PCT/US2009/052273—ISA/EPO—Mar. 22, 2010.

(Continued)

*Primary Examiner* — Nay A Maung
*Assistant Examiner* — Erica Fleming-Hall
(74) *Attorney, Agent, or Firm* — François A. Pelaez

(57) ABSTRACT

Reverse link interference can be controlled by utilizing a dynamic and changeable IoT setpoint, which is a quantitative measurement of total interference received at a base station. The interference can occur when a mobile device in an adjacent sector is communicating over the reverse link. The IoT setpoint can be changed based on conditions occurring in the sector and/or scheduling information for the future. A fast up indicator (Up+) can be transmitted for reverse link interference, which allows the receiving device to take advantage of the fact that additional interference created will not affect the sector. An interference control action can be transmitted in an Other Sector Interference Bit (OSIB) channel over the air or over the backhaul. The interference control action can be determined as a function of the dynamic IoT setpoint.

36 Claims, 14 Drawing Sheets

(56) References Cited

U.S. PATENT DOCUMENTS

| | | | |
|---|---|---|---|
| 2006/0019694 A1* | 1/2006 | Sutivong | H04W 52/24 455/522 |
| 2006/0045061 A1* | 3/2006 | Duan et al. | 370/342 |
| 2006/0094372 A1* | 5/2006 | Ahn et al. | 455/67.13 |
| 2006/0135070 A1* | 6/2006 | Karabinis | 455/63.1 |
| 2006/0209721 A1* | 9/2006 | Mese et al. | 370/254 |
| 2006/0234752 A1* | 10/2006 | Mese et al. | 455/522 |
| 2007/0042718 A1* | 2/2007 | Camacho et al. | 455/69 |
| 2007/0042784 A1* | 2/2007 | Anderson | 455/450 |
| 2007/0082619 A1* | 4/2007 | Zhang et al. | 455/69 |
| 2008/0032732 A1* | 2/2008 | Hosein | 455/522 |
| 2008/0045234 A1* | 2/2008 | Reed | 455/456.1 |
| 2008/0076408 A1* | 3/2008 | Katayama et al. | 455/424 |
| 2008/0102836 A1* | 5/2008 | Wang et al. | 455/436 |
| 2008/0214230 A1* | 9/2008 | Shinozaki | 455/522 |
| 2008/0227405 A1* | 9/2008 | Harel et al. | 455/69 |
| 2008/0242301 A1* | 10/2008 | Osterling et al. | 455/436 |
| 2008/0247375 A1* | 10/2008 | Muharemovic et al. | 370/344 |
| 2008/0279121 A1* | 11/2008 | Englund et al. | 370/278 |
| 2009/0061886 A1* | 3/2009 | Cozzo et al. | 455/450 |
| 2009/0247175 A1* | 10/2009 | van Rensburg et al. | 455/450 |
| 2009/0270109 A1* | 10/2009 | Wang Helmersson et al. | 455/453 |
| 2010/0041395 A1* | 2/2010 | Karabinis | 455/427 |
| 2010/0233962 A1* | 9/2010 | Johansson et al. | 455/63.1 |
| 2011/0009157 A1* | 1/2011 | Osterling et al. | 455/522 |
| 2012/0064936 A1* | 3/2012 | Vrzic et al. | 455/522 |

OTHER PUBLICATIONS

Lucent Technologies: "Uplink Scheduling With Inter—cell Interference Control" 36PP Draft; R2-062814, SRD Generation Partnership Project (3GPP), Mobile Competence Centre ; 650, Route Des Lucioles ; F-06921 Sophia-Antipolis Cedex ; France, vol. RAN WG2, No. Seoul, Korea; Oct. 5, 2006, XP050132339.

Nokia Siemens Networks et al: "Overload Indicato (OI) Configuration and Reporting Criteria" 3GPP Draft; R1-082600, 3rd Generation Partnership Project (3GPP), Mobile Competence Centre; 650,Route Des Lucioles; F-06921 Dophia-Antipolis Cedex; France, vol. RAN WG1, No. Warsaw, Polan; Jun. 25, 2008 XP050110854. pp. 1,3.

Sharp: "On overload indicator triggering and reporting format" 3GPP Draft; R1-081762, 3rd Generation Partnership Project (3GPP), Mobile Competence Centre; 650, Route Des Lucioles; F-06921 Sophia-Antipolis Cedex ; France, vol. RAN WG1, No. Kansas City, USA; May 14, 2008, XP050110147.

Telecom Italia: "Summary of email discussion on UL and DL ICIC" 3GPP Draft; R1 080511,3RE Generation Partnership Project (3GPP), Mobile Competence Centre; 650,Route Des Lucioles; F-06921 Sophia-Antipolis Cedex; France, vol. RAN WG1, No. Sevilla, Spain; Jan. 19, 2008, XP050108546 p. 1.

R1 080511, 3RE GENERATION PARTNERSHIP PROJECT (3GPP), MOBILE COMPETENCE CENTRE; 650,ROUTE DES LUCIOLES; F-06921 SOPHIA-ANTIPOLIS CEDEX; FRANCE, vol. RAN WG1, NO. Sevilla, Spain; 20080119, Jan. 19, 2008, XP050108546 p. 1.

* cited by examiner

DYNAMIC IOT SETPOINTS AND INTERFERENCE CONTROL

BACKGROUND

I. Field

The following description relates generally to wireless communication systems and more particularly to techniques for interference control in a wireless communication system.

II. Background

Wireless communication systems are deployed to provide a multitude of communication services such as voice, video, packet data, broadcast, and messaging services as well as others. These systems can be multiple-access systems capable of supporting communication for a number of terminals by sharing available system resources. Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, as well as other systems.

Wireless multiple-access communication systems can simultaneously support communication for multiple wireless terminals. In such systems, each terminal can communicate with one or more sectors through transmissions on the forward and reverse links. The forward link (or downlink) refers to the communication link from the sectors to the terminals, and the reverse link (or uplink) refers to the communication link from the terminals to the sectors. These communication links can be established through a single-in-single-out (SISO), multiple-in-single-out (MISO), and/or multiple-in-multiple-out (MIMO) systems.

Multiple terminals can simultaneously transmit on the reverse link by multiplexing their transmissions to be orthogonal to one another in the time, frequency, and/or code domain. If complete orthogonality between transmissions is achieved, transmissions from each terminal do not interfere with transmissions from other terminals at a receiving sector. However, complete orthogonality among transmissions from different terminals is often not realized due to channel conditions, receiver imperfections, as well as other factors. As a result, terminals often cause some amount of interference to other terminals. Furthermore, because transmissions from terminals communicating with different sectors are typically not orthogonal to one another, each terminal can also cause interference to terminals communicating with nearby sectors. This interference can result in a decrease in performance at each terminal in the system. Accordingly, there is a need for effective techniques to mitigate the effects of interference in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The described aspects mitigate the above-mentioned problems by providing techniques for interference control that can be based on instantaneous load information in a serving sector. One or more aspects can mitigate traditional restrictions that an Interference Over Thermal (IoT) value be maintained in a sector even if the sector is currently insensitive to high IoT setpoints. The IoT value is a quantitative measurement of total interference received at a base station and can indicate the impact of interference to mobile devices in the serving sector. For simplicity purposes, the term IoT is utilized herein to describe a manner of quantifying interference impact. However, there can be other manners of quantifying impact or other terms can be utilized to describe this impact and the disclosed aspects are intended to capture all such substantially equivalent manners and/or terms.

An aspect relates to a method for controlling reverse link interference with a dynamic interference setpoint. The method includes establishing an interference setpoint associated with a serving sector and measuring an interference value that is a function of the amount of reverse link interference experienced by the serving sector. The method also includes determining an action for interference control based on a comparison of the interference setpoint and the interference value. The action is communicated to one or more devices in a neighboring sector. The interference setpoint is a dynamic setpoint that is adjusted based on current parameters or predicted needs of the serving sector.

Another aspect relates to a wireless communications apparatus that includes a memory and a processor. The memory retains instructions related to establishing a dynamic interference setpoint based on current parameters or predicted needs of a serving sector. The memory also retains instructions related to calculating an amount of interference received at the serving sector, comparing the interference setpoint with the amount of received interference to determine an action, and communicating the action to at least one device in a neighboring sector. The processor is coupled to the memory and configured to execute the instructions retained in the memory.

Still another aspect relates to a wireless communications apparatus that controls reverse link interference. The wireless communications apparatus includes a means for establishing a dynamic interference setpoint based on current parameters or predicted needs of a serving sector and a means for calculating an amount of interference received at the serving sector. Further, the wireless communications apparatus includes a means for determining an action based on a comparison of the interference setpoint with the amount of received interference and a means for communicating the action to a neighboring sector.

A further aspect relates to a computer program product that comprises a computer-readable medium that includes a first set of codes for causing a computer to establish a serving sector target interference setpoint that is dynamically adjusted based on current parameters or predicted needs of the serving sector. The computer-readable medium also includes a second set of codes for causing the computer to measure an amount of interference experienced by the serving sector and a third set of codes for causing the computer to recommend an action to be taken based on a comparison of the target interference setpoint and the measured amount of interference. The measured amount of interference is an interference value. A fourth set of codes for causing the computer to communicate the recommended action to devices in one or more neighboring sectors is also included in the computer-readable medium. The communication can be over the air or over a backhaul channel.

Still another aspect relates to at least one processor configured to control interference in a serving sector. The processor includes a first module for measuring an amount of interference experienced by the service sector and a second module for establishing a target interference setpoint that is dynamically adjusted based on current parameters or predicted need of the serving sector. Further, the processor includes a third module for comparing the measured amount of interference and the target interference setpoint and recommending an action to be taken based on the comparison and a fourth module for setting a bit in an OSIB channel to indicate the recommended action and communicating the OSIB channel to a neighboring sector over the air or over a backhaul channel.

Yet another aspect relates to a method for controlling reverse link interference in a wireless communications environment. The method includes evaluating serving sector information and an amount of reverse link interference tolerable to the serving sector and calculating an amount of interference experienced in the serving sector. The method also includes determining an interference indicator can be set to a fast up indicator (Up+) based on an evaluation of the tolerable amount of interference and the amount of interference experienced and transmitting an OSIB channel to one or more devices in an adjacent sector. The OSIB channel includes the fast up indicator.

Another aspect relates to a wireless communications apparatus that includes a processor and a memory. The memory retains instructions related to evaluating a serving sector and an amount of interference that can be tolerated by the serving sector and measuring an amount of interference experienced by the serving sector. The memory also retains instructions related to determining an interference indicator can be set to a fast up indicator (Up+) and transmitting an OSIB channel that includes the fast up indicator to one or more adjacent sectors. The processor is coupled to the memory and is configured to execute the instructions retained in the memory.

A further aspect relates to a wireless communications apparatus that controls reverse link interference. The wireless communications apparatus includes a means for evaluating a serving sector and an amount of interference that can be tolerated by the serving sector and a means for measuring an amount of interference experienced by the serving sector. The wireless communications apparatus also includes a means for determining an interference indicator can be set to a fast up indicator (Up+) and a means for transmitting an OSIB channel that includes the fast up indicator to devices in one or more adjacent sectors.

Still another aspect relates to a computer program product comprising a computer-readable medium that includes a first set of codes for causing a computer to calculate an amount of interference received by a serving sector. The computer-readable medium also includes a second set of codes for causing the computer to evaluate the serving sector and an amount of interference that the serving sector can tolerate and a third set of codes for causing the computer to determine a fast up indicator can be set based on the evaluation. A fourth set of codes for causing the computer to transmit an OSIB channel that includes the fast up indicator is also included in the computer-readable medium. The transmission occurs over the air or over a backhaul channel.

Yet another aspect relates to at least one processor configured to control reverse link interference. The processor includes a first module for evaluating information associated with a serving sector and an amount of interference that can be tolerated and a second module for calculating an amount of interference experienced by the serving sector. The processor also includes a third module for determining a bit in an OSIB channel can be set to a fast up indicator based on the evaluation and the amount of interference calculated and a fourth module for transmitting the OSIB channel to an adjacent sector over the air or over a backhaul.

A further aspect relates to a method for reverse link interference management. The method includes receiving an OSIB channel and evaluating the OSIB channel for a fast up indicator (Up+). Further the method includes quickly adjusting a transmit power to a higher level and transmitting a signal over a reverse link with the higher level transmit power.

Another aspect relates to a wireless communications apparatus that includes a memory and a processor. The processor is coupled to the memory and configured to execute the instructions retained in the memory. The memory retains instructions related to receiving an OSIB channel that includes a plurality of bits and evaluating the OSIB channel to determine if a bit related to a fast up indicator is set. The memory also retains instructions related to adjusting a transmit power to a higher level if the bit related to the fast up indicator is set and transmitting a signal at the higher transmit power level.

Yet another aspect relates to a wireless communications apparatus that manages reverse link interference. The wireless communications apparatus includes a means for receiving an OSIB channel over the air from a base station in an adjacent sector or from a serving base station that received the OSIB channel over a backhaul and a means for evaluating the OSIB channel to determine if a fast up indication bit in the channel is set. Also included in the wireless communications apparatus is a means for rapidly adjusting a transmit power to a higher level if the fast up indication bit is set and a means for transmitting a signal using the higher transmit power level.

Another aspect relates to a computer program product comprising a computer-readable medium. The computer-readable medium includes a first set of codes for causing a computer to receive an OSIB channel and a second set of codes for causing the computer to evaluate the OSIB channel for a fast up indicator. Also included in the computer-readable medium is a third set of codes for causing the computer to adjust a transmit power to a higher level at a rate that conforms to the fast up indicator and a fourth set of codes for causing the computer to transmit a signal over a reverse link. The signal is transmitted with the higher transmit power level.

Still another aspect relates to at least one processor configured to manage reverse link interference. The processor includes a first module for receiving an OSIB channel that was sent over the air or over a backhaul and a second module for identifying if the OSIB channel includes a fast up indicator. Also included in processor is a third module for quickly increasing a transmit power level if the fast up indicator is included in the OSIB channel and a fourth module for transmitting a signal at the increased transmit power level.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
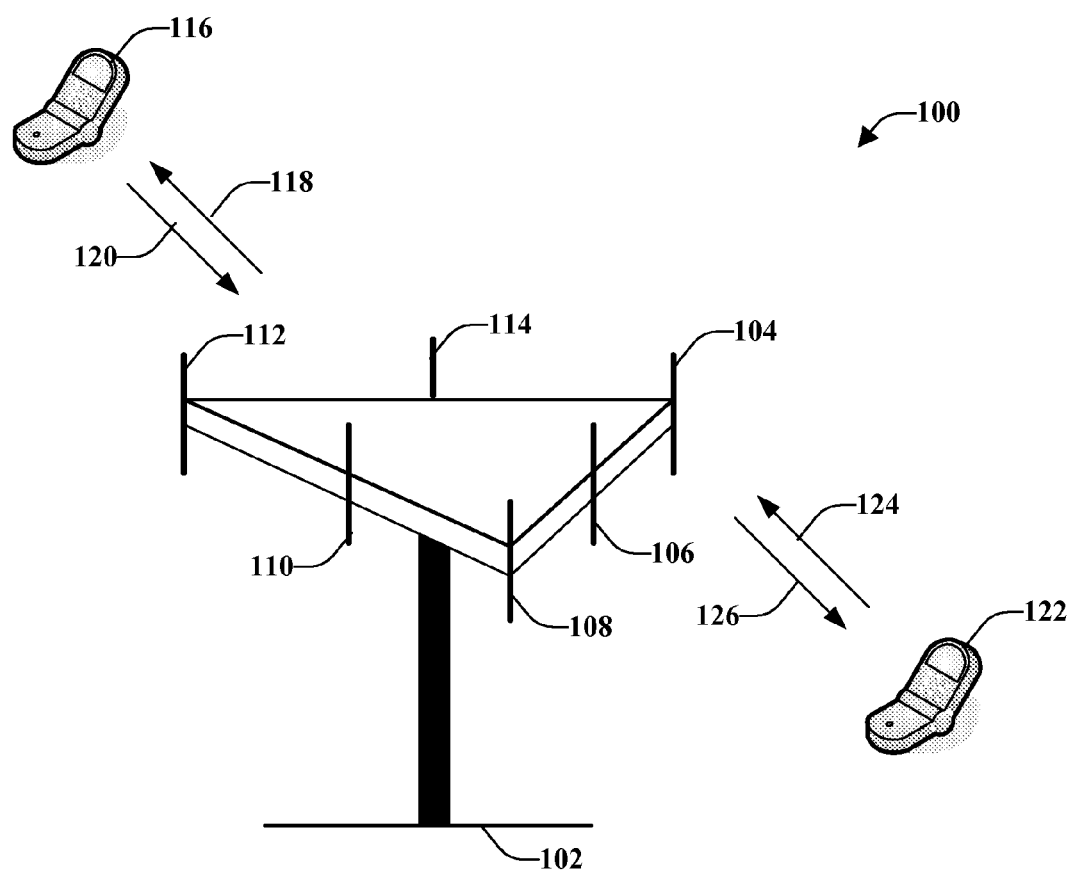
FIG. 1 illustrates a multiple access wireless communication system according to one or more aspects.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, and the like, and/or may not include all of the devices, components, modules, and the like, discussed in connection with the figures. A combination of these approaches may also be used.

Referring now to FIG. 1, a multiple access wireless communication system 100 according to one or more aspects is illustrated. A wireless communication system 100 can include one or more base stations in contact with one or more user devices. Each base station provides coverage for a plurality of sectors. Illustrated is a three-sector base station 102 that includes multiple antenna groups, one including antennas 104 and 106, another including antennas 108 and 110, and a third including antennas 112 and 114. According to the figure, only two antennas are shown for each antenna group, however, more or fewer antennas may be utilized for each antenna group. Mobile device 116 is in communication with antennas 112 and 114, where antennas 112 and 114 transmit information to mobile device 116 over forward link 120 and receive information from mobile device 116 over reverse link 118. Forward link (or downlink) refers to the communication link from the base stations to mobile devices, and the reverse link (or uplink) refers to the communication link from mobile devices to the base stations. Mobile device 122 is in communication with antennas 104 and 106, where antennas 104 and 106 transmit information to mobile device 122 over forward link 126 and receive information from mobile device 122 over reverse link 124.

Each group of antennas and/or the area in which they are designated to communicate may be referred to as a sector of base station 102. In one or more aspects, antenna groups each are designed to communicate to mobile devices in a sector or the areas covered by base station 102. A base station may be a fixed station used for communicating with the terminals.

In accordance with the various aspects presented herein, mobile devices that are in adjacent cells (not shown) and served by other base stations (not shown) can create interference to base station 102 and/or mobile devices it is serving (e.g., mobile devices 116, 122). As used herein, the term "cell" refers to a base station and its coverage area, depending on the context in which the term is used. The interference can occur on a reverse link when a mobile device in an adjacent cell is transmitting to its serving base station, which is referred to as reverse link (RL) interference. In order to mitigate RL interference, base station 102 can transmit an Other Sector Interference Bit (OSIB) channel, which can be one or more bits, that includes control signaling, such as a fast up indication (Up+). The OSIB channel is a direct channel that provides information related to control signaling for interference control. The control signaling information can be utilized by neighboring sectors to decrease an IoT value, which is a quantitative measurement of a total interference detected by base station 102. Additionally or alternatively, an algorithm that sets OSIB transmission values in a sector can be modified to allow a target IoT setpoint of a sector to be achieved according to current and/or predicted activity needs of the sector. The IoT setpoint is a number with which the IoT value is compared and is characteristic of a desired IoT. For example, an IoT value that is less than the IoT setpoint is favorable. The OSIB channel can be received by mobile devices that are near base station 102 and/or the OSIB channel can be received by neighboring base stations over a backhaul channel. If over the backhaul, the neighboring base station can, in turn, communicate interference management information (e.g., transmit power information) to mobile devices it is serving.

Figure 2:
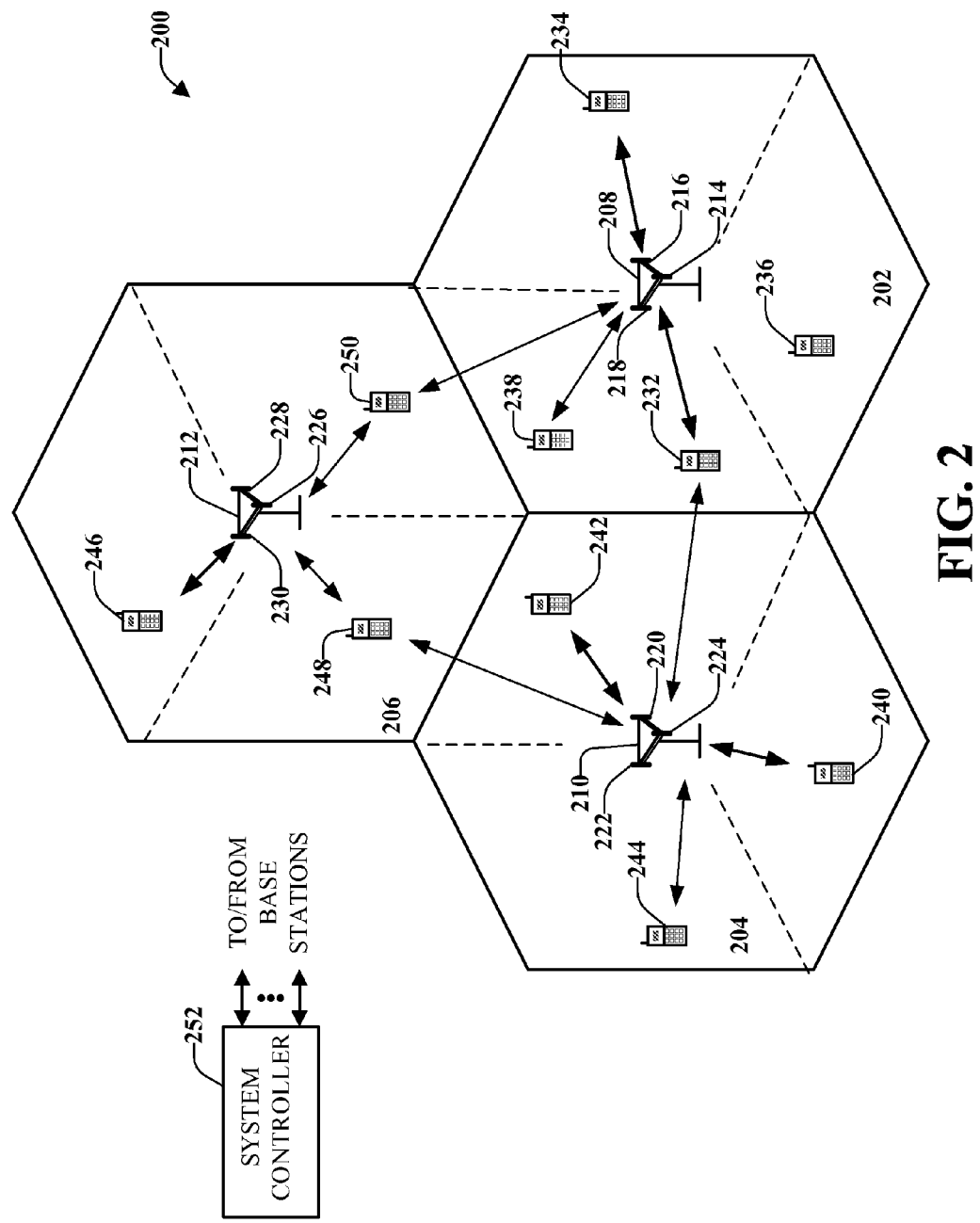
FIG. 2 illustrates a representation of a multiple access wireless communication system for reverse link interference management in accordance with the aspects presented herein.

FIG. 2 illustrates a multiple access wireless communication system 200 for reverse link interference management in accordance with the aspects presented herein. System 200 can facilitate inclusion of a fast up indication (Up+) in an OSIB channel. In accordance with some aspects, the OSI bits can be based on predicted scheduling information. Additionally or alternatively, system 200 can manage a transmit power of mobile devices in other sectors that is based on instantaneous load information in a sector. Utilizing instantaneous load information can mitigate a conventional restriction that an IoT setpoint be maintained in a sector even if the sector is, at any particular time, insensitive to high IoT setpoints.

For a sectorized cell, the access points for all sectors of that cell are typically co-located within the base station for the cell. The reverse link interference management techniques described herein may be used for a system with sectorized cells and a system with un-sectorized cells. In this description, the term "sector" refers to a conventional base station and/or its coverage area for a system with sectorized cells and/or a conventional base station and/or its coverage area for a system with un-sectorized cells. The terms "mobile device" (or the like) and "user" may be used interchangeably, and the terms "sector" and "base station" may also be used interchangeably. A serving base station/sector is a base station/sector with which a terminal communicates. A neighbor (or adjacent) base station/sector is a base station/sector with which the terminal is not in communication.

The reverse link interference management techniques may also be used for various multiple-access communication systems. For example, these techniques may be used for a code division multiple access (CDMA) system, a frequency division multiple access (FDMA) system, a time division multiple access (TDMA) system, an orthogonal frequency division multiple access (OFDMA) system, an interleaved (IFDMA) system, a localized FDMA (LFDMA) system, a spatial division multiple access (SDMA) system, a quasi-orthogonal multiple-access system, and so on. IFDMA is also called distributed FDMA, and LFDMA is also called narrowband FDMA or classical FDMA.

In further detail, multiple access wireless communication system 200 includes multiple cells, illustrated as cells 202, 204, and 206. In FIG. 2, each cell 202, 204, and 206 can include a base station 208, 210, 212 that includes multiple sectors. The multiple sectors are formed by groups of antennas each responsible for communication with access terminals in a portion of the cell. In cell 202, antenna groups 214, 216, and 218 each correspond to a different sector. In cell 204, antenna groups 220, 222, and 224 each correspond to a different sector. In cell 206, antenna groups 226, 228 and 230 each correspond to a different sector.

Each cell includes several mobile devices, illustrated as access terminals, which are in communication with one or more sectors of each base station. Mobile devices are typically dispersed throughout the system, and each terminal can be fixed or mobile. A terminal can communicate with zero, one, or multiple base stations on the forward and reverse links at any given moment. For example, access terminals 232, 234, 236, and 238 are in communication with base station 208, access terminals 240, 242, and 244 are in communication with access point 210, and access terminals 246, 248, and 250 are in communication with access point 212.

As illustrated in cell 204, for example, each access terminal 240, 242, and 244 is located in a different portion of it respective cell than each other access terminal in the same cell. Further, each access terminal 240, 242, and 244 can be a different distance from the corresponding antenna groups with which it is communicating. Both of these factors provide situations, also due to environmental and other conditions in the cell, to cause different channel conditions to be present between each access terminal and its corresponding antenna group with which it is communicating.

A controller 252 is coupled to each of the cells 202, 204, and 206 and provides coordination and control for the respective base stations. Controller 252 can be a single network entity or a collection of network entities. For a distributed architecture, the base stations can communicate with one another as needed. Controller 252 can contain one or more connections to multiple networks, such as the Internet, other packet based networks, or circuit switched voice networks that provide information to, and from, the access terminals in communication with the cells of the multiple access wireless communication system 200. Controller 252 includes, or is coupled with a scheduler that schedules transmission from and to access terminals. In some embodiments, scheduler can reside in each individual cell, each sector of a cell, or a combination thereof.

It should be noted that while FIG. 2, depicts physical sectors (e.g. having different antenna groups for different sectors), other approaches can be utilized. For example, utilizing multiple fixed "beams" that each cover different areas of the cell in frequency space can be utilized in place of, or in combination with, physical sectors.

In accordance with some aspects, access terminals in a particular cell may be in communication with the base station associated with that cell and at substantially the same time can cause interference to a base station (and/or mobile devices) associated with a neighboring cell. For example, when access terminal 232 communicates with its serving base station 208 on the reverse link, the communication may also be received by access point 210. This can cause inter-sector interference (also referred to as other sector interference (OSI) or RL interference) to access point 210 and/or the mobile devices it is serving. In a similar manner, communications from access terminal 248 may be received (e.g., interference) by access points 210 and 212, communications from access terminal 250 may be received (e.g., interference) by access points 208 and 212, and so forth. In an attempt to mitigate the interference experienced, base station 210, for example, can send an OSIB channel that contains control information or control signaling for the mobile devices that are causing interference, as well as other mobile devices that can receive the signal transmitted by base station 210. Further information relating to conveying OSIB channels in accordance with various aspects is described in further detail below. It should be noted that the dynamic and changeable IoT setpoint, alone or in conjunction with an "Up+" value, could be transmitted over the air, directly to mobile devices, or over the backhaul to neighboring base stations.

Figure 3:
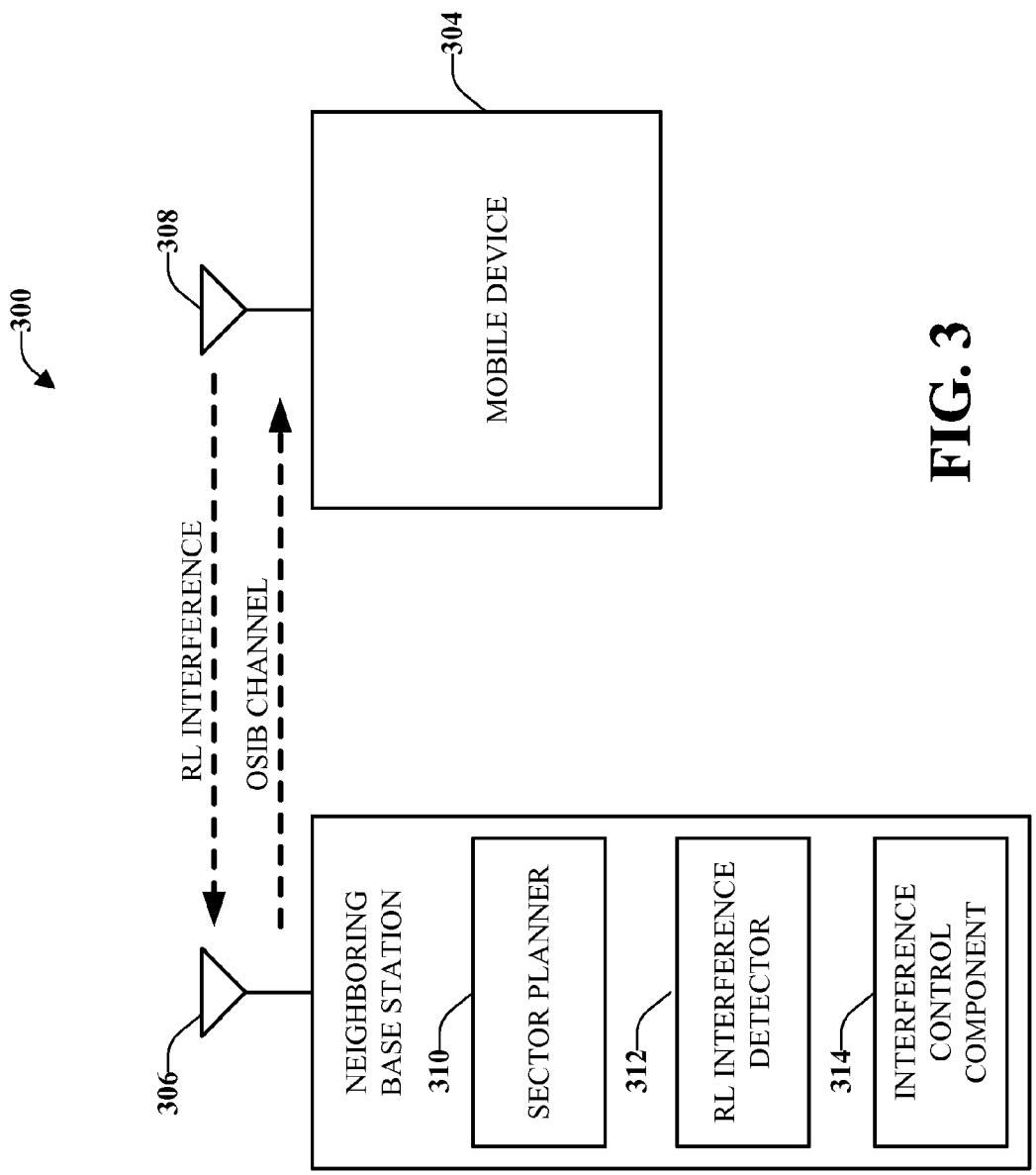
FIG. 3 illustrates a block diagram of an example system for using dynamic IoT setpoints for interference control in a wireless communication system.

FIG. 3 illustrates a block diagram of an example system 300 for using dynamic IoT setpoints for interference control in a wireless communication system. System 300 includes a wireless communications apparatus, represented as a base station 302 that can communicate with a wireless communications apparatus, represented as a mobile device 304, in a neighboring sector, on a forward link and/or a reverse link through one or more antennas 306 at base station 302 and one or more antennas 308 at terminal 304. It should be appreciated that neighboring base station 302 can provide coverage for a cell (e.g., a cell 202) or an area within a cell (e.g. a sector 204). In addition, while only one base station 302 and mobile device 304 are illustrated in system 300 for brevity, system 300 can include any number of base stations and/or mobile devices. For example, system 300 can include one or more neighboring base stations, which can provide coverage for respective geographic areas that can include all, part, or none of an area covered by base station 302. Additionally, system 300 can include a serving base station (not shown) that provides coverage for mobile device 304.

In accordance with an aspect, when mobile device 304 transmits to a serving base station (not shown) on a reverse link (RL), a neighboring base station 302 can experience reverse link (RL) interference. Based on the amount of RL interference detected by base station 302, an OSIB channel can be broadcast for reception by users in neighboring sectors (e.g., mobile device 304). In one example, base station 302 can broadcast other sector interference (OSI) messages and/or other similar information corresponding to whether the base station 302 is experiencing excessive interference. This information can be broadcast though a dedicated OSI channel and/or another suitable channel. Once broadcast, OSI messages can then be used by terminals 304 to adjust resources used for transmission on the reverse link.

Some conventional techniques utilize distributed reverse link power control algorithms that attempt to maintain a static, unchangeable IoT setpoint by transmitting an OSIB channel that includes signaling information related to this static IoT setpoint for reception by mobile devices 304 in other sectors. In these conventional systems, the IoT setpoint is typically a fixed value. The corresponding power control reaction of a mobile device 304 to this channel can be complex, including considerations from all sectors and relative channel strength differences. There are shortcomings of the techniques utilized by conventional systems. A shortcoming is that there is the assumption that a static IoT setpoint is desirable. This might not be the case, especially in partial loading cases where a particular sector might not be sensitive to high IoT at certain times (e.g. if there are no mobile devices scheduled in the sector). One or more of the disclosed aspects provide for the capability of highly dynamic IoT setpoints.

System 300 is configured to modify an algorithm that sets the OSIB transmission values in a sector. While conventional systems set the OSIB to target a particular static IoT setpoint, system 300 allows the target IoT setpoint of a target sector to be set according to a current and/or a predicted activity and needs of the sector. For example, if no users are scheduled in the sector, or if the active users in the sector have very strong channels, the IoT setpoint for the sector can be increased.

In further detail, base station 302 includes a sector planner 310 that is configured to evaluate mobile devices within a serving sector. Sector planner 310 can gather (e.g. observe, receive, solicit) information relating to current information and/or future information. The information (either or both current and future) can include characteristics of the mobile devices in the sector, mobile devices that might join the sector in the future, mobile devices that might leave the sector at a later time, or combinations thereof. The information might include characteristics of traffic currently occurring within the sector and/or traffic that might occur in the sector at a future time. Based on the information gathered, sector planner 310 can set an IoT setpoint, which can be a dynamic value. If changes in the network or projected changes are indicated, the IoT setpoint can be dynamically changed by sector planner 310 to take into account the changes and to optimize network communications. For example, if there is a different deployment characteristic or a different application that is to be optimized, the IoT setpoint can be dynamically modified to account for the deployment characteristic or application. The IoT setpoint can be adjusted any number of times in accordance with the disclosed aspects. The IoT setpoint is an indication of the amount of interference that can be tolerated by the serving sector.

An RL interference detector 312 is configured to evaluate the RL interference received from neighboring mobile devices 304 and calculate a current IoT value. The RL interference is caused when mobile device 304 communicates on the RL link to its serving base station. If mobile device 304 is close to the sector served by base station 302, excessive RL interference might develop. On the other hand, if mobile device 304 is not near the sector served by base station 302, mobile device 304 might cause little, if any, RL interference.

An interference control component 314 evaluates the IoT setpoint established by sector evaluator 310 and the IoT value calculated by RL interference detector 312 to determine an action that should be taken to control interference. For example, interference control component 314 can compare the IoT value with the IoT setpoint to determine an interference level experienced by the sector. If excessive interference is detected, interference control component 314 can take action to maintain or optimize stability and performance of the network. Interference control component 314 sets one or more bits of an OSIB channel based on the action that should be taken. The OSIB channel is transmitted to one or more mobile devices 304. In accordance with various aspects, the OSIB channel can be transmitted over the air and/or over the backhaul.

In accordance with some aspects, the dynamic IoT setpoint assignment provided by sector planner 310 is in addition to a basic IoT setpoint (utilized in conventional systems). System 300 recognizes the value of providing a variable, dynamic IoT setpoint, wherein base station 302 can have different thresholds for IoT depending on current conditions and/or future conditions (either expected or planned).

For example, if a sector has no users, the IoT value is not as important because there are no users that will be impacted by that interference. Further, there might not be a reason to transmit a message to mobile devices 304 in other sectors to turn down respective transmissions (e.g., transmit power) since there are no users being harmed. It should be noted that conventional techniques utilize a static IoT setpoint and, thus, even if there are no users in the sector, the IoT setpoint is strictly maintained. Thus, even if there are no users and a measured IoT value is higher than the static IoT setpoint, an OSIB channel is sent that indicates an action that should be taken by neighboring sectors to mitigate interference (e.g., to reduce a transmit power). The aspects disclosed herein mitigate such problems with the static IoT setpoint, which can allow neighboring mobile devices 304 to transmit at a higher power, which might improve communications for those mobile devices and/or other devices to which they are communicating. Continuing the above example, if a mobile device enters the serving sector, base station 302 can convey information in an OSIB channel that indicates a different action. Thus, due to the new device, the IoT setpoint might be changed. If a higher IoT setpoint was allowed previously (because no, or few, users were in the sector) that high IoT setpoint might now be damaging to the sector (e.g., cause interference to the new device). Thus, base station 302 can dynamically change the IoT setpoint to inform other devices to mitigate the interference content so links can be established with this new mobile device in the sector.

In another example, there are a few mobile devices within a sector that manage the RL interference well. For example, these mobile devices might have a strong reverse link channel and, as such, are not significantly impacted by the IoT value However, if one or more of the mobile devices are moved to an edge of the sector, the RL interference might be higher and the mobile device is impacted, thus, the IoT setpoint threshold becomes important. Therefore, base station 302 can dynamically change an IoT setpoint and transmit different signaling information in an OSIB channel. The IoT setpoint changes in accordance with the changing conditions in the sector.

Therefore, system 300 can utilize a dynamic IoT setpoint for situations in which a static, fixed IoT setpoint is not appropriate. However, in accordance with some aspects, a static IoT setpoint can be chosen. For example, it might be appropriate to mitigate interference for deployment of a voice service utilizing a static IoT setpoint. If a higher IoT setpoint is established, it indicates the threshold is less likely to be met and therefore the base station is less likely to send an OSIB channel that indicates devices in other sectors should take action to reduce an IoT value (e.g., reduce a transmit power). Further, the IoT setpoint can be changed on the fly, as needed.

In accordance with some aspects, base station 302 can include a memory that retains instructions related to establishing a dynamic interference setpoint based on current parameters or predicted needs of the serving sector. The memory can also retain instructions related to calculating an amount of interference received at the serving sector, comparing the interference setpoint with the amount of received interference to determine an action, and communicating the action to at least one device (such as wireless communications device 304) in a neighboring sector. A processor can be coupled to the memory and configured to execute the instructions retained in the memory.

Figure 4:
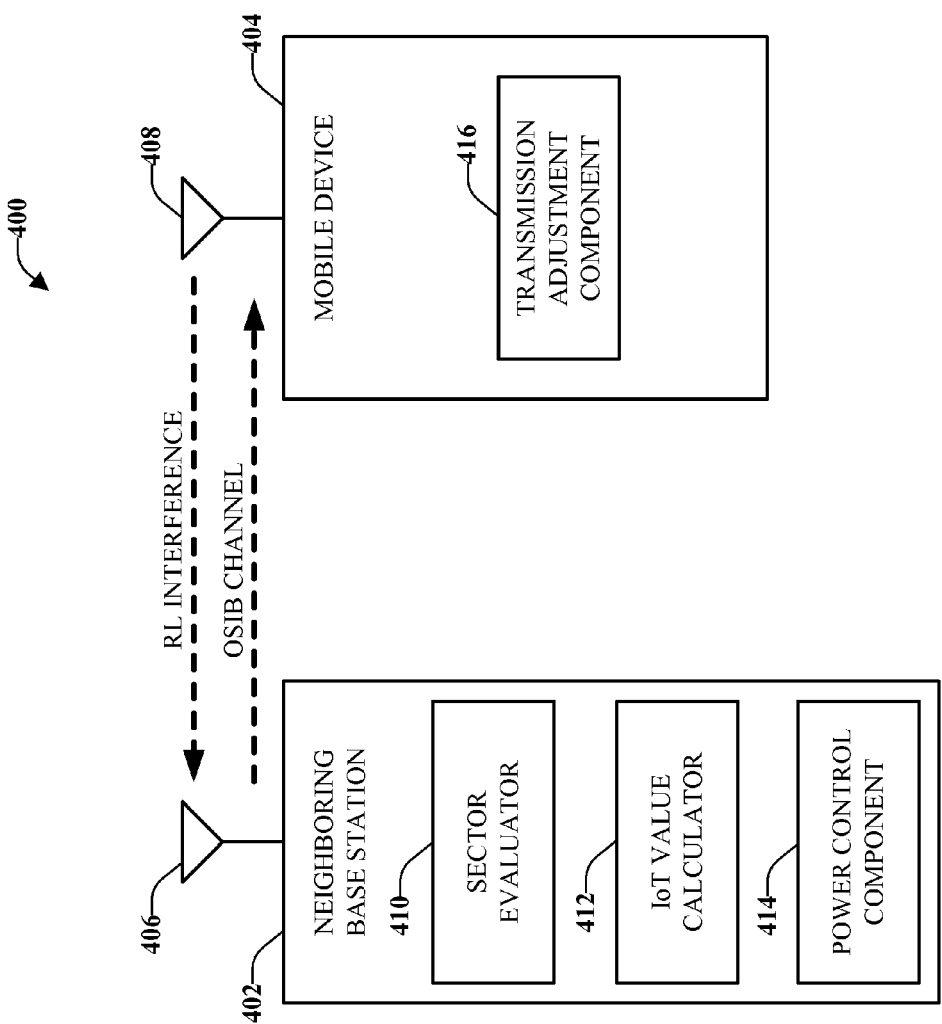
FIG. 4 illustrates a block diagram of an example system for utilizing a fast up indicator in accordance with some aspects.

FIG. 4 illustrates a block diagram of an example system 400 for utilizing a fast up indicator in accordance with some aspects. System 400 includes a wireless communications apparatus, represented as a base station 402 that can communicate with a wireless communications apparatus, represented as a mobile device 404, in a neighboring sector, on a forward link and/or a reverse link through one or more antennas 406, 408. It should be appreciated that neighboring base station 402 can provide coverage for a cell (e.g., a cell 202) or an area within a cell (e.g., a sector 204). In addition, more than one base station 402 and more than one mobile device 404 can be included in system 400. For example, system 400 can include one or more neighboring base stations, which can provide coverage for respective geographic areas that can include all, part, or none of an area covered by base station 402. Additionally, system 400 can include a serving base station (not shown) that provides coverage for mobile device 404.

In accordance with an aspect, when mobile device 404 transmits to a serving base station (not shown) on a reverse link (RL), neighboring base station 402 can experience reverse link (RL) interference. Based on the amount of RL interference detected by base station 402, an OSIB bit can be broadcast for reception by users in neighboring sectors (e.g. mobile device 404). In one example, base station 402 can broadcast other sector interference (OSI) messages and/or other information corresponding to the amount of interference the base station 402 is experiencing. This information can be broadcast though a dedicated OSI channel and/or another suitable channel. Once broadcast, OSI messages can be used by terminals 404 (in other sectors) to adjust resources used for transmission on the reverse link.

Some conventional techniques utilize an OSIB channel that contains three values: "Up", "Down", and "Down+". "Up" indicates that the sector's IoT value is below an IoT setpoint, "Down" indicates the sector's IoT value is above the IoT setpoint, and "Down+" indicates the sector's IoT value is critically high. System 400 provides an "Up+" indication on the OSIB channel, which is useful in an environment with dynamic IoT setpoints. For example, when the IoT setpoint goes up very quickly, the sector could signal "Up+" so that mobile devices 402 in other sectors can quickly take advantage of the higher allowed IoT (e.g., those devices can transmit at a higher power).

A simple example of an advantage of system 400 is that it enables sectors that are partially loaded to indicate insensitivity to IoT whenever there are no users scheduled in the sector. The mobile devices in neighboring sectors can quickly increase their transmit power during this interval to take advantage of the fact that the additional interference that they create does not hurt this sector.

Base station 402 includes a sector evaluator 410 that is configured to evaluate the serving sector of base station 402. Sector evaluator 410 can gather (e.g., observe, receive, solicit) information relating to current information and/or future information. The information (either or both current and future) can include characteristics of the mobile devices in the sector, mobile devices that might join the sector in the future, mobile devices that might leave the sector at a later time, or combinations thereof. The information might include characteristics of traffic currently occurring within the sector and/or traffic that might occur in the sector at a future time. Sector evaluator 410 can establish an IoT setpoint for the sector based on the evaluation.

An IoT value calculator 412 can evaluate information within the sector and calculate an IoT value. The IoT value is a measure of the overall interference experienced in the sector, which can include thermal noise.

Based on the IoT setpoint and the IoT value, a power control component 414 can include information in an OSIB channel to inform devices in neighboring sectors (e.g., mobile device 404) whether a transmit power on the reverse link should be adjusted. Such adjustments can include a fast Up ("Up+") that indicates that the neighboring devices 404 can take advantage of additional power resources without contributing an undesirable level of interference to base station's 402 serving sector. The Up+ can be sent if the IoT setpoint is much higher than the IoT value (e.g., the serving sector can tolerate much more interference). The "Up+" indication is a recognition that faster control of the interference in warranted in certain types of environments. Thus, the sector (e.g. base station 402) can not only turn down adjacent users very quickly ("Down+") but, if for example the opposite happens where all users in the serving sector go away (e.g. shut down respective connections, handed off to neighboring sectors), base station 402 can quickly notify neighboring users that they can utilize more transmit power though an "Up+" indicator.

By way of example and not limitation, base station 402 can utilize an algorithm, method, or other means to determine an appropriate value (e.g., "Up", "Up+", "Down", "Down+") to transmit based on the presence and characteristics of the reverse link to the users in the sector (e.g. IoT value). A simple situation is if all users in the sector vanish and base station 402 wants to allow higher IoT ("Up+") and, also, there may be situations for which base station 402 wants to allow a lower IoT ("Down" or "Down+"). A more complex algorithm is one that has finer grade tuning. Thus, depending on the cumulative susceptibility of the RL in the sector to IoT, base station 402 can calculate a mathematical formula for the threshold of IoT that could be used (e.g., IoT setpoint). In another example, if there are no users, base station 402 can decide not to send a message, or an "Up" or "Up+" indicator can be sent, depending on how quickly neighboring users should raise respective transmit power levels.

After the OSIB channel is transmitted, mobile devices in neighboring sectors, such as mobile device 404, can receive the OSIB channel and evaluate the information contained therein. If the "Up+" portion of the control channel is implemented (e.g. as applied by base station 402), a transmission adjustment component 416 responds in a different way than with traditional techniques that only utilize three values ("Up", "Down", and "Down+"). For example, "Up+" is used when there are no users in the sector and, thus, transmission adjustment component 416 can increase its transmit power as desired.

In accordance with some aspects, the "Up+" value can be utilized at substantially the same time as dynamic IoT setpoint, as previously discussed. The rate at which mobile device 402 responds to a traditional up and down commands ("Up", "Down", "Down+") can be relatively slow if the devices are simply utilizing a fixed IoT setpoint that over the long term is trying to be met. With a dynamic IoT setpoint, there is faster control of the interference. In situations where allowing a larger IoT setpoint is desired, with a slow command, such as "Up", it might take the mobile device an excessive amount of time to take advantage of the insensitivity of the interference of the sector. The fast up command ("Up+") allows mobile devices 404 to more rapidly adjust under these conditions.

For example, base station 402 has the option of sending an "Up" or an "Up+". If the IoT value is less than a threshold value (e.g., IoT setpoint) and there is some susceptibility to the level of interference, base station 402 might chose to send "Up". If, for example, the IoT value is zero, the base station 402 might indicate that not only is the RL interference level below the threshold (e.g., IoT setpoint), but that base station 402 can allow users to come up (e.g., increase transmit power level) much more quickly. In this situation, base station 402, might chose to send an "Up+" to allow mobile devices 404 to take advantage of the situation much more quickly.

In accordance with some aspects, base station 402 includes a memory that can retain instructions related to evaluating the serving sector and an amount of interference that can be tolerated by the serving sector and measuring an amount of interference experienced by the serving sector. Memory can further determine an interference indicator can be set to a fast up indicator (Up+) and transmit an OSIB channel that includes the fast up indicator to one or more adjacent sectors for receipt by wireless communications apparatus 304.

Mobile device 404 can include a memory that retains instructions related to receiving an OSIB channel that includes a plurality of bits and evaluating the OSIB channel to determine if a bit related to a fast up indicator is set. The OSIB channel can be received from a serving base station that received the OSIB channel over the backhaul and/or the OSIB channel can be received over the air from a neighboring sector. The memory can also retain instructions related to adjusting a transmit power to a higher level if the bit related to the fast up indicator is set, and transmitting a signal at the higher transmit power level. A processor can be coupled to the memory and configured to execute the instructions retained in the memory.

Figure 5:
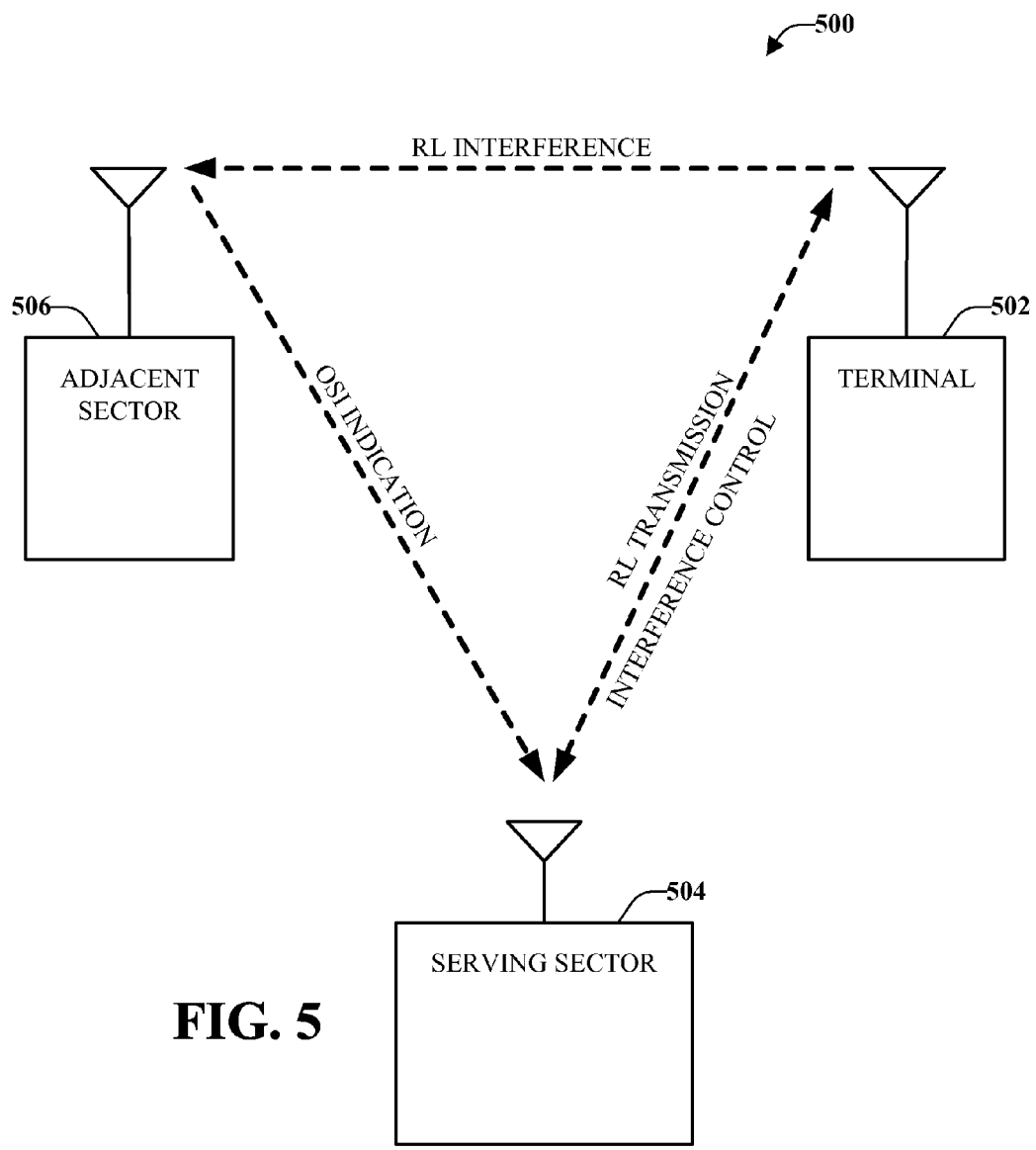
FIG. 5 illustrates an example system for reverse link (RL) interference management over a backhaul channel in accordance with the aspects disclosed herein.

FIG. 5 illustrates an example system 500 for reverse link (RL) interference management over a backhaul channel in accordance with the aspects disclosed herein. The various aspects disclosed herein can be made over the air interference management or backhaul interference management.

As illustrated, a mobile device 502 can transmit a reverse link transmission to its serving base station 504. However, due to various factors, reverse link interference can be received by devices in an adjacent sector 506. In accordance with the disclosed aspects, the adjacent sector 506 can transmit an OSIB channel that includes control signaling information that is a function of a dynamic IoT setpoint and/or a fast up ("Up+") indicator (or other indicator) to the serving sector 504 over a backhaul channel. The serving sector 504 can receive the OSIB indication and convey the information to a mobile device 502, which responds to the information by adjusting a transmit power or though other adjustments. Thus, regardless of whether the RL inference management is over the air or over the backhaul, the mobile device 502 responds in a similar manner.

For example, mobile device 502 can utilize one or more delta-based power control techniques when the mobile device engages in transmissions on the reverse link with a serving base station after receiving indications of interference from adjacent base stations (e.g., directly from the base station or over the backhaul). For example, mobile device 502 can utilize a delta-based power control technique in which the transmit power of mobile device 502 can be adjusted based on a delta offset value. By way of a specific, non-limiting example, a delta offset value can correspond to a transmit power difference between a pilot channel and a traffic channel utilized by mobile device 502 and/or any other suitable metric. Further information relating to power control and interference control are disclosed in U.S. patent application Ser. No. 10/897,463 entitled "POWER CONTROL FOR A WIRELESS COMMUNICATION SYSTEM UTILIZING ORTHOGONAL MULTIPLEXING" and U.S. patent application Ser. No. 11/158,584 entitled "INTERFERENCE CONTROL IN A WIRELESS COMMUNICATION SYSTEM", which are assigned to the assignee hereof, and hereby incorporated by reference.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
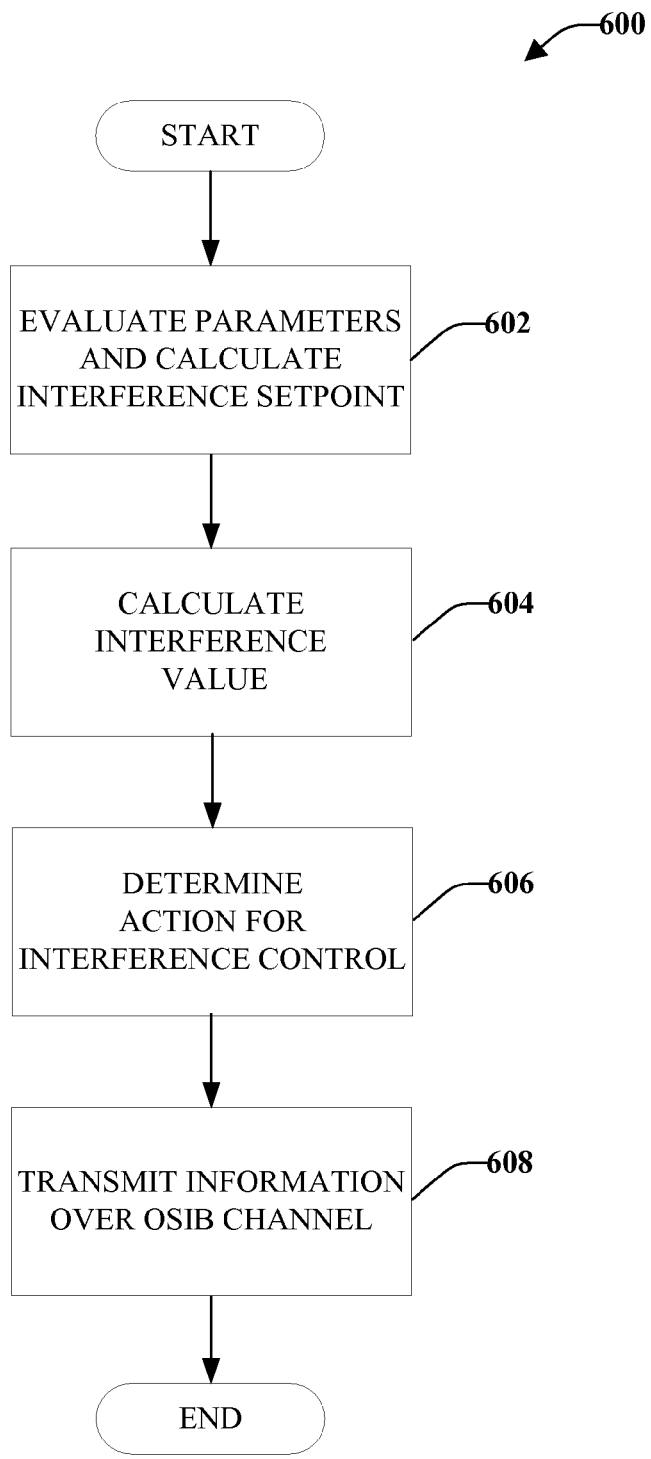
FIG. 6 illustrates a method for reverse link (RL) interference control, which can be utilized to guarantee minimum system stability and quality of service (QoS) parameters for a communication network.

FIG. 6 illustrates a method 600 for reverse link (RL) interference control, which can be utilized to guarantee minimum system stability and quality of service (QoS) parameters for a communication network. Method 600 can enable a dynamic IoT setpoint, where the setpoint is based on known and/or predicted sector needs.

Method 600 starts, at 602, when parameters associated with a serving sector are evaluated and an interference setpoint established based on the parameters. These parameters can relate to characteristics of the devices within the sector, characteristics of traffic in the sector, characteristics of planned or potential devices and/or traffic in the sector as well as other parameters. The parameters can be gathered though observance of the communications occurring within the network. In accordance with some aspects, the parameters can be gathered by soliciting information from the devices within the network (e.g., device capabilities, device parameters, and so forth). In accordance with other aspects, the parameters can be automatically received, such as when a device enters a network (e.g., during handoff).

The interference setpoint can be dynamically adjusted (e.g., on the fly) based on both current conditions in the sector as well as future conditions that can be predicted to a reasonable amount of certainty. In accordance with some aspects, the IoT setpoint can be established based on the parameters, current sector needs, or combinations thereof.

At 604, the level or amount of reverse link (RL) interference is measured or determined and the interference experienced by the serving sector is identified as an interference value. The interference value is a constantly changing value that is a function of the interference caused by a multitude of devices.

The interference setpoint and the interference value are compared, at 606, to determine an action that should be taken for interference management, which can include sending an instruction for an action that should be taken by devices in other sectors. Information related to the action that should be taken is included in an OSIB channel, wherein one or more bits are set to "1" or "0", depending on the action that should be taken. In accordance with some aspects, the action that should be taken is a dynamic IoT setpoint with a fast up (Up+) indicator.

At 608, the information related to the action that should be taken is transmitted over an OSIB channel. As such, the OSIB channel is communicated to mobile devices in other sectors to convey interference management instructions. Communicating the action can include setting a bit in an OSIB channel to indicate the action, wherein the OSIB bit is set based on known future scheduling information of the serving sector. The OSIB channel can be communicated to the other sectors over the air or over a backhaul channel. In accordance with some aspects, the interference setpoint is an IoT setpoint and the interference value is an IoT value.

For example, a mobile device located closer to its serving base station may be allowed to transmit at a higher power level since the terminal will likely cause less interference to other base stations (e.g. in adjacent sectors). Conversely, a mobile device located farther away from its serving base station and toward the edge of the coverage area of its serving base station may be restricted to a lower transmit power level since the mobile device may cause more interference to neighboring base stations. By controlling transmit power in this manner, method 600 can mitigate the total interference observed by adjacent base stations (e.g., IoT value) while allowing "qualified" terminals to achieve higher SNRs and thus higher data rates. In accordance with some aspects, the OSI bit is set based not only on IoT, but also on known scheduling information for the future.

The dynamic and changeable IoT setpoints are transmitted, at 608, over the air or, in accordance with some aspects over the backhaul. According to some aspects, the dynamic IoT setpoint can be transmitted at substantially the same time as a fast up ("Up+") indicator is transmitted.

Figure 7:
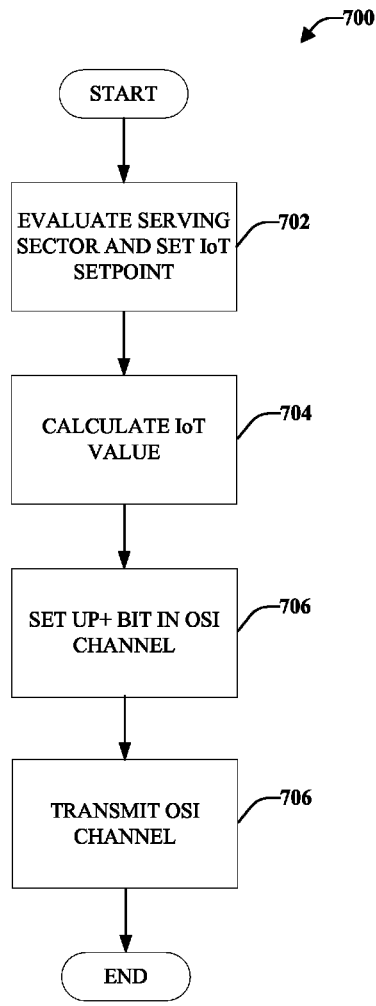
FIG. 7 illustrates a method for reverse link interference management utilizing a fast up (Up+) indicator.

With reference now to FIG. 7, illustrated is a method 700 for reverse link interference management utilizing a fast up (Up+) indicator. There can be some situations when devices in adjacent cells can transmit on a reverse link without causing undue reverse link interference to an adjacent cell.

At 702, serving sector information is evaluated and an IoT setpoint is established. The serving sector information can be at least one of requirements of one or more devices within the serving sector, traffic requirements occurring in the serving sector, known scheduling information, or combinations thereof. The evaluation can include evaluating requirements of devices within the sector, traffic requirements, as well as other information. Additionally or alternatively, information relating to the affect of RL interference on the devices and/or traffic occurring in the serving sector (or that might occur in the sector in the near future) can be evaluated. It the sector is insensitive to interference, the IoT setpoint can be set to a higher level. Thus, the IoT setpoint is an indication of the amount of reverse link interference that can be tolerated by the serving sector.

At 704, an IoT value is calculated that quantifies the amount of interference experienced in the sector. The IoT value is a measure of interference caused by neighboring sectors.

At 706, the IoT value is compared to the IoT setpoint and an appropriate IoT setpoint included in an OSI channel. The IoT setpoint can be one of a four-level OSIB channel. The OSI channel includes information related to controlling a transmit power of devices in adjacent sectors. The four-levels include "Up", "Up+", "Down", and "Down+". "Down+" is a recognition that if a mobile device suddenly shows up in a neighboring sector and happens to contribute a substantial IoT, then the sector is able turn down the transmit power of that device quickly enough such that all of the links would not fail in the neighboring sector. The "Up+" value allows the opposite to occur, such that if devices in the adjacent cell have no affect (or very little affect) on the serving sector, the devices might be allowed to set respective power levels as high as desired. If the IoT setpoint is much higher than the IoT value (e.g., the sector can tolerate a large amount of inter-sector interference), an Up+ indication is included in the OSIB channel. The fast up indicator "Up+" allows mobile devices to quickly respond to an increased IoT setpoint. Further, the fast up indicator enables the transmit power of mobile devices in an adjacent sector to be based on instantaneous load information in a sector.

The IoT setpoint is indicated in the OSI channel as a set bit and the OSI channel is transmitted to the adjacent sectors, at 708. This transmission can occur over the air or over a backhaul, depending on network configurations. In accordance with some aspects, the "Up+" indicator is utilized at substantially the same time as a dynamic IoT setpoint is utilized in accordance with the aspects disclosed herein.

Figure 8:
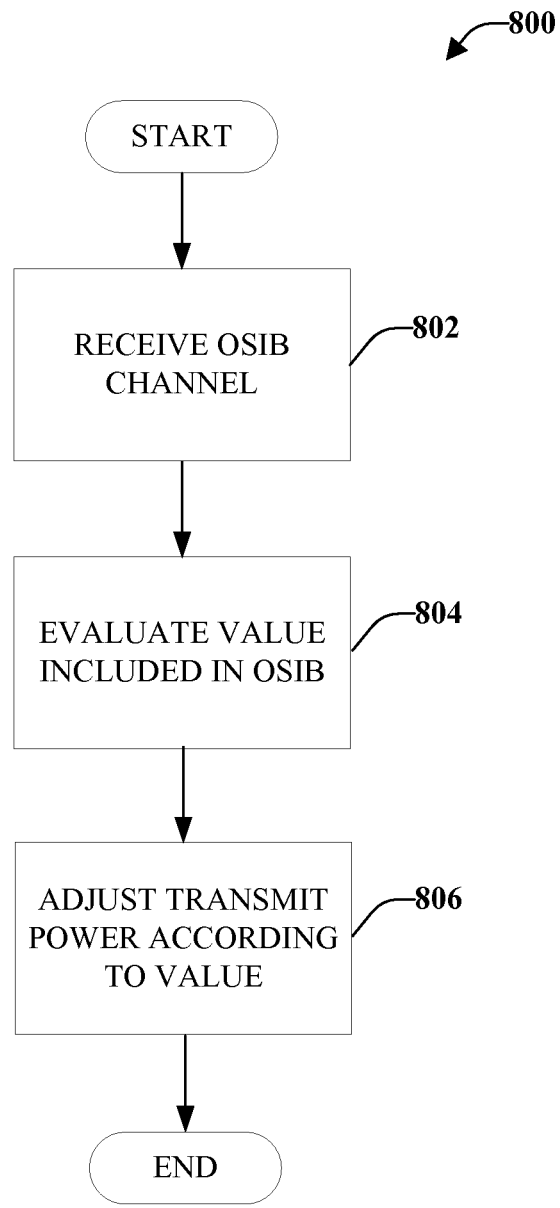
FIG. 8 illustrates a method for responding to a received fast up (Up+) indicator that is utilized for RL interference management.

FIG. 8 illustrates a method 800 for responding to a received fast up ("Up+") indicator that is utilized for RL interference management. Method 800 can enable sectors that are partially loaded to indicate an insensitivity to IoT whenever there are no users scheduled in the sector. Mobile devices in neighboring sectors can quickly increase their transmit power during this interval to take advantage of the fact that the additional interference that they create does not affect the sector.

At 802, an OSIB channel is received from a base station in an adjacent sector. The OSIB channel can be sent in response to RL interference experienced by devices (e.g., base station, mobile devices) in the adjacent sector. The OSIB channel can be sent over the air or, in accordance with some aspects, over a backhaul channel.

The OSIB channel is evaluated, at 804, for a value (or set bit) that indicates how a transmit power of the receiving device should be changed. The values include "Up", "Up+", "Down" and "Down+". If a "Down" value is received, it indicates that the transmit power should be reduced. If a "Down+" is received, it indicates that the transmit power should be quickly reduced. An "Up" indicates that the receiving device can increase the transmit power. An "Up+" indicates that the transmit power of the receiving device can be increased at a fast rate. Based on the value received, the transmit power is adjusted accordingly, at 806. For example, if a fast up indicator is received, the transmit power is quickly adjusted to a higher level; and a signal is transmitted over the reverse link with the higher level transmit power.

Figure 9:
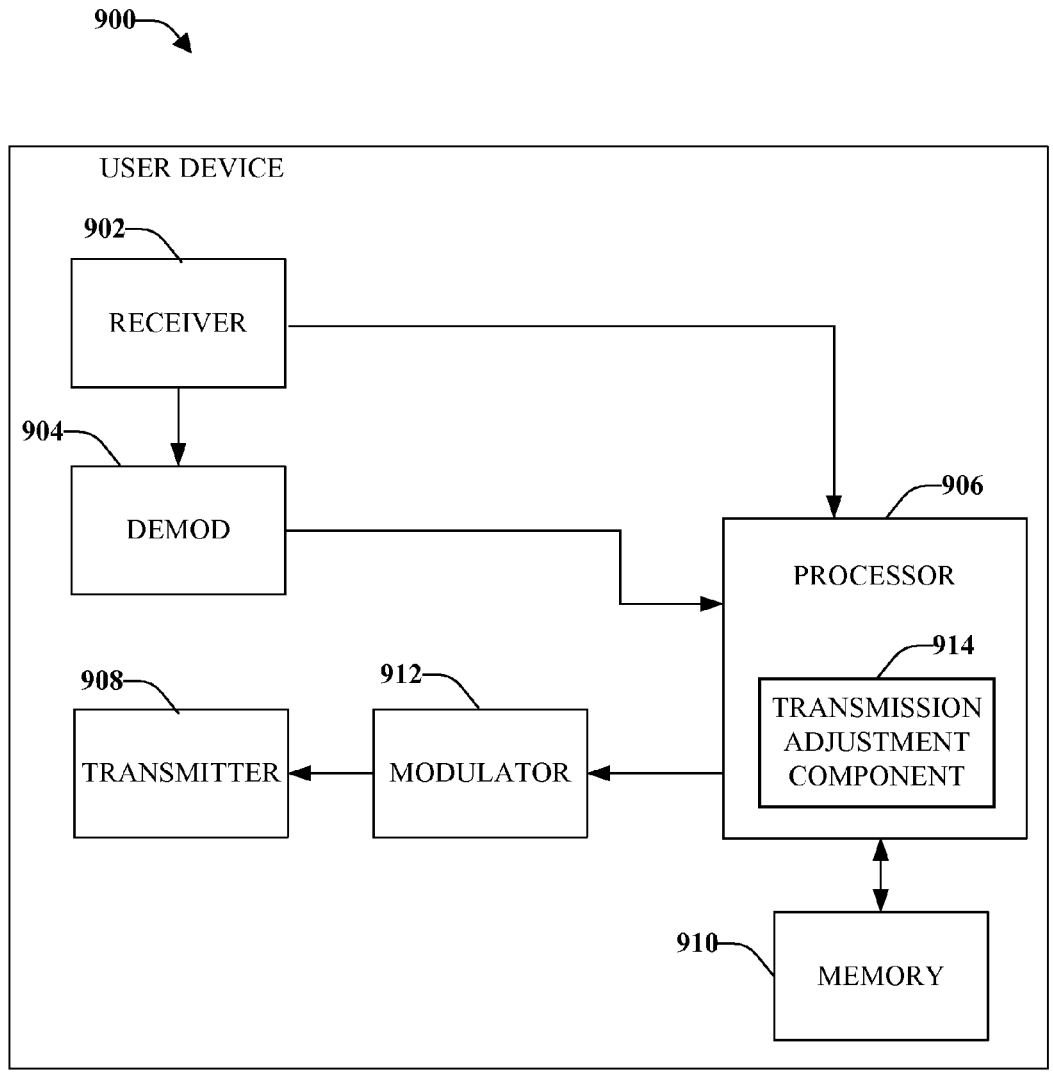
FIG. 9 illustrates a system that facilitates receiving an OSIB channel that includes a fast Up (Up+) indicator in accordance with one or more of the disclosed aspects.

With reference now to FIG. 9, illustrated is a system 900 that facilitates receiving an OSIB channel that includes a fast Up (Up+) indicator in accordance with one or more of the disclosed aspects. System 900 can reside in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitize the conditioned signal to obtain samples. A demodulator 904 can obtain received symbols for each symbol period, as well as provide received symbols to a processor 906.

Processor 906 can be a processor dedicated to analyzing information received by receiver component 902 and/or generating information for transmission by a transmitter 908. In addition or alternatively, processor 906 can control one or more components of user device 900, analyze information received by receiver 902, generate information for transmission by transmitter 908, and/or control one or more components of user device 900. Processor 906 may include a controller component capable of coordinating communications with additional user devices.

User device 900 can additionally comprise memory 908 operatively coupled to processor 906 and that can store information related to coordinating communications and any other suitable information. Memory 910 can additionally store protocols associated with sample rearrangement. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 can further comprise a symbol modulator 912 and a transmitter 908 that transmits the modulated signal.

Processor 906 can include a transmission adjust comment 914 that can be configured to adjust a transmission based on an OSIB channel received from a base station in a neighboring sector. In accordance with some aspects, the OSIB channel can receive a fast up indicator ("Up+") that allows device 902 to quickly increase its transmit power.

Figure 10:
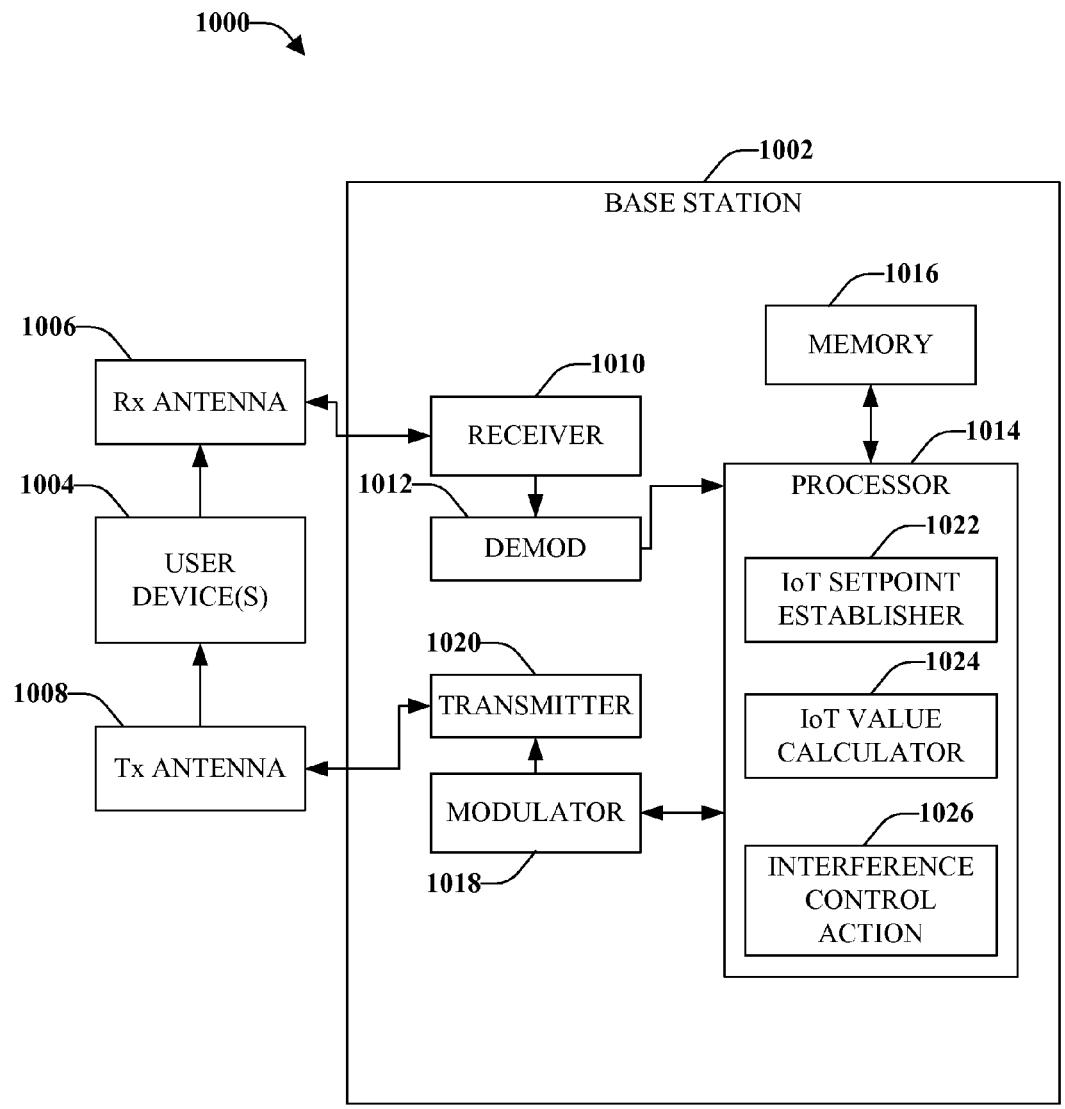
FIG. 10 illustrates a system that facilitates transmitting an OSIB channel that includes power control information in accordance with one or more of the disclosed aspects.

FIG. 10 is an illustration of a system 1000 that facilitates transmitting an OSIB channel that includes power control information in accordance with one or more of the disclosed aspects. System 1000 comprises a base station or access point 1002. As illustrated, base station 1002 receives signal(s) from one or more user devices 1004 by a receive antenna 1006, and transmits to the one or more user devices 1004 through a transmit antenna 1008.

Base station 1002 comprises a receiver 1010 that receives information from receive antenna 1006 and is operatively associated with a demodulator 1012 that demodulates received information. Demodulated symbols are analyzed by a processor 1014 that is coupled to a memory 1016 that stores information related to broadcast-multicast waveforms embedded in a unicast waveform. A modulator 1018 can multiplex the signal for transmission by a transmitter 1020 through transmit antenna 1008 to user devices 1004.

Processor 1014 can include an IoT setpoint establisher 1022 that can create an IoT setpoint based on both current and/or predicted devices in a sector, traffic in the sector, or characteristics thereof. The IoT setpoint is a dynamic value that can be changed as needed based on current and/or predicted serving sector parameters. Also included is an IoT value calculator 1024 that can measure an amount of interference received in the sector and quantify the interference. An interference control action 1026 can determine an action for interference control based on the IoT setpoint and the IoT value. In accordance with some aspects, the action is for devices in a neighboring sector to reduce and/or increase a transmit power level. For example, if the serving sector is insensitive to interference (e.g., there are no devices currently in the sector), the interference control action 1026 can be to set (e.g., set to "1") a bit in an OSIB channel that indicates that devices can quickly increase their transmit power ("Up+"). The OSIB channel is sent by transmitter 1020.

Figure 11:
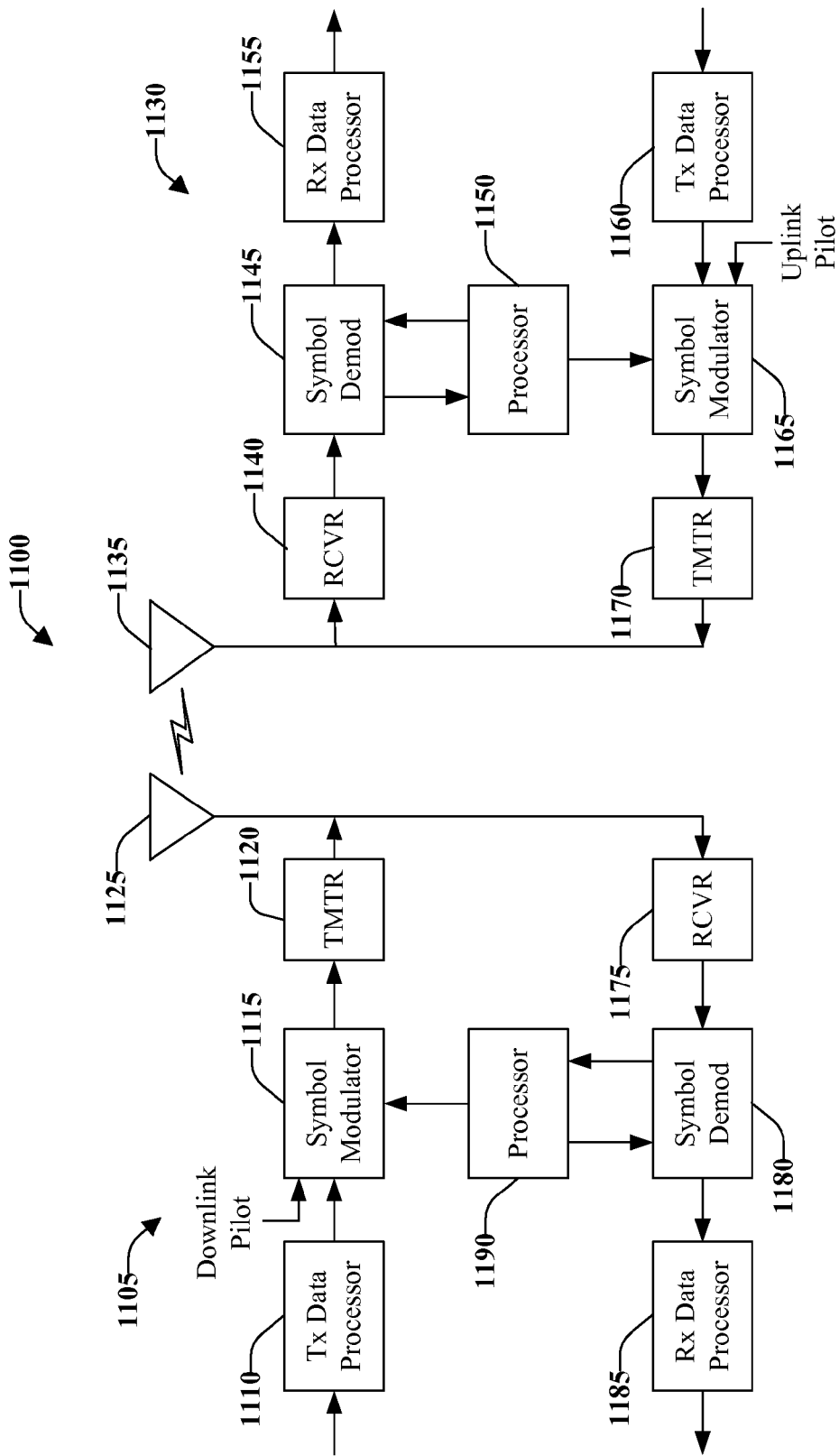
FIG. 11 illustrates an exemplary wireless communication system that can be utilized with the disclosed aspects.

FIG. 11 illustrates an exemplary wireless communication system 1100 that can be utilized with the disclosed aspects. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different from the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g. filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

At access point 1105, the uplink signal from terminal 1130 is received by the antenna 1125 and processed by a receiver unit 1175 to obtain samples. A symbol demodulator 1180 then processes the samples and provides received pilot symbols and data symbol estimates for the uplink. An RX data processor 1185 processes the data symbol estimates to recover the traffic data transmitted by terminal 1130. A processor 1190 performs channel estimation for each active terminal transmitting on the uplink.

Processors 1190 and 1150 direct (e.g., control, coordinate, manage, operation at access point 1105 and terminal 1130, respectively. Respective processors 1190 and 1150 can be associated with memory units (not shown) that store program codes and data. Processors 1190 and 1150 can also perform computations to derive frequency and impulse response estimates for the uplink and downlink, respectively.

For a multiple-access system (e.g., FDMA, OFDMA, CDMA, TDMA, and the like), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
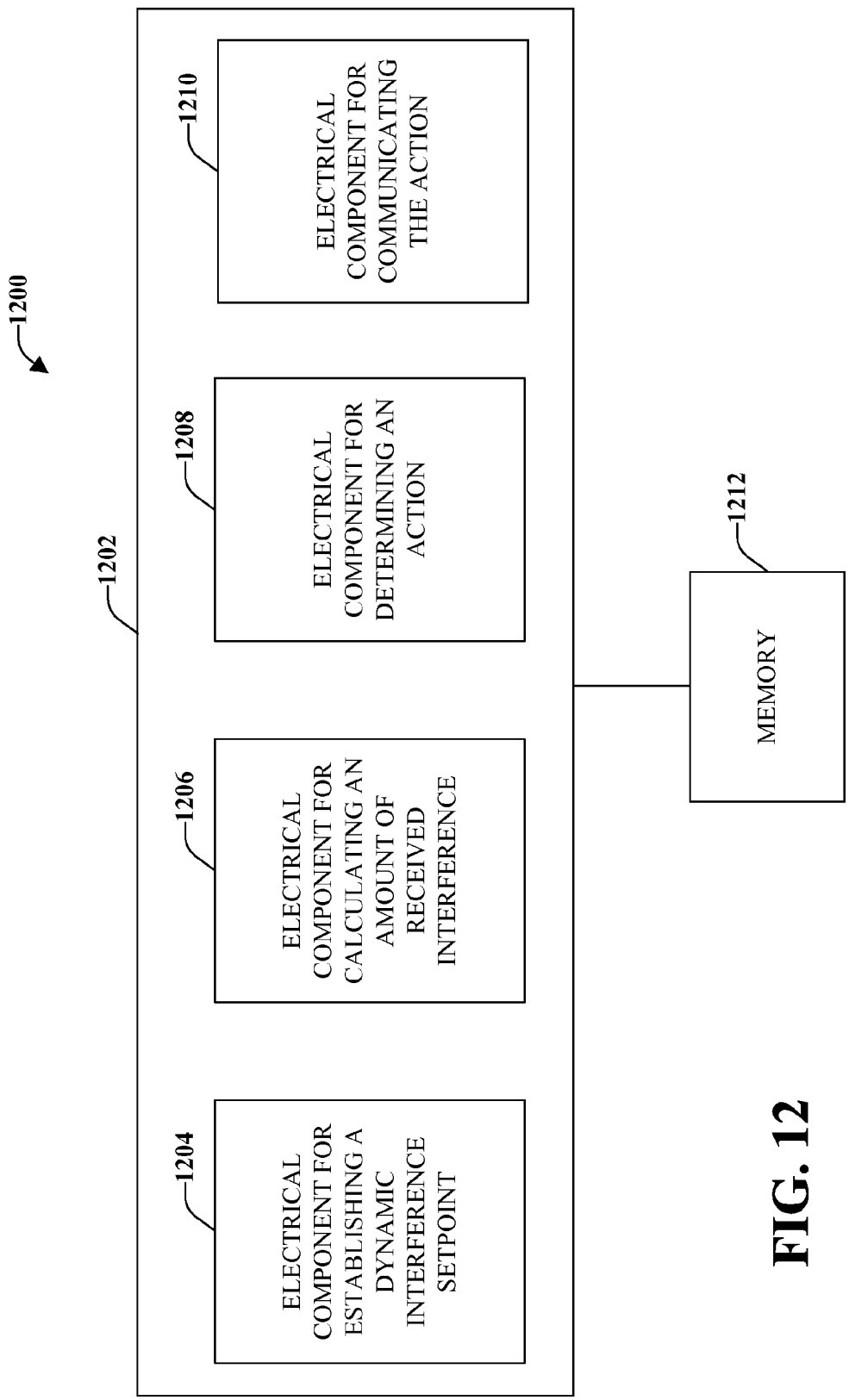
FIG. 12 illustrates an example wireless communications apparatus that that controls reverse link interference.

With reference to FIG. 12, illustrated is an example wireless communications apparatus 1200 that controls reverse link interference. It is to be appreciated that wireless communications apparatus 1200 is represented as including functional blocks, which may be functional blocks that represent functions implemented by a processor, software, or combination thereof (e.g., firmware).

Wireless communications apparatus 1200 includes a logical grouping 1202 of electrical components that can act separately or in conjunction. Logical grouping 1202 includes an electrical component 1204 for establishing a dynamic interference setpoint based on current parameters or predicted needs of a serving sector. The dynamic interference setpoint can be a target interference setpoint that is dynamically adjusted based on the current parameters or predicted needs of the serving sector.

Also included in logical grouping 1202 is an electrical component 1206 for calculating an amount of interference received at the serving sector. The amount of interference received can represent the amount of interference experienced by mobile devices within the serving sector. The measured amount of interference is referred to as an interference value. In accordance with some aspects, the interference setpoint is denoted as an IoT setpoint and the interference value is denoted as an IoT value.

Logical grouping 1202 also includes an electrical component 1208 for determining an action based on a comparison of the interference setpoint with the amount of received interference. Electrical component 1208 can represent the action as a dynamic IoT setpoint with a fast up (Up+) indicator. An electrical component 1210 for communicating the action to a neighboring sector is also included in logical grouping 1202. Electrical component 1210 can set at least one bit in an OSIB channel to "1" or "0" depending on the determined action.

Additionally, wireless communications apparatus 1200 can include a memory 1212 that retains instructions for executing functions associated with electrical components 1204, 1206, 1208, and 1210 or other components. While shown as being external to memory 1212, it is to be understood that one or more of electrical components 1204, 1206, 1208, and 1210 may exist within memory 1212.

Figure 13:
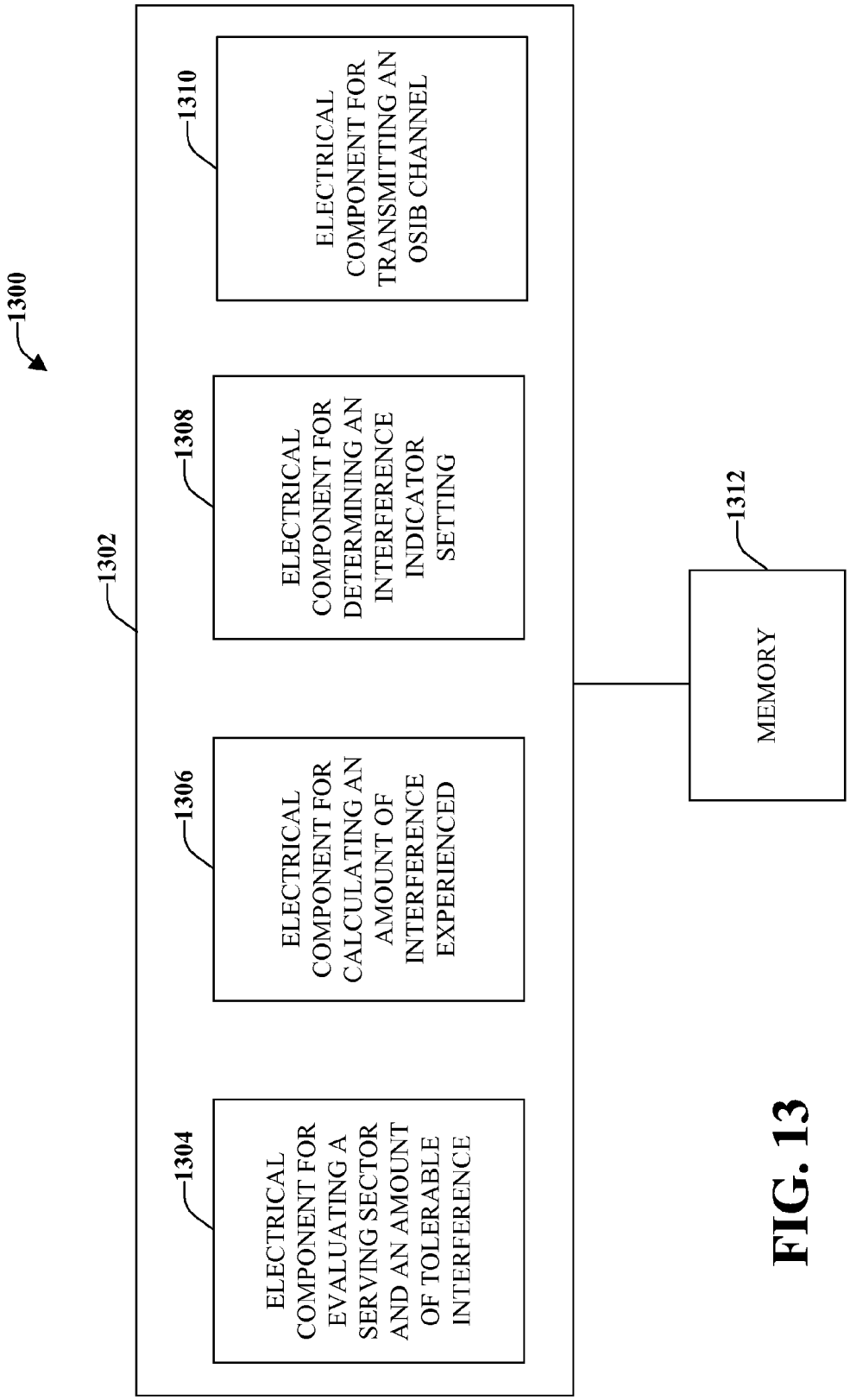
FIG. 13 illustrates an example wireless communications apparatus that controls reverse link interference in a wireless communications network.

FIG. 13 illustrates an example wireless communications apparatus 1300 that controls reverse link interference in a wireless communications network. Wireless communications apparatus 1300 is represented as including functional blocks, which may be functional blocks that represent functions implemented by a processor, software, or combination thereof (e.g., firmware).

Included in wireless communications apparatus 1300 is a logical grouping 1302 of electrical components that can act separately or in conjunction. Logical grouping 1302 includes an electrical component 1304 for evaluating a serving sector and an amount of interference that can be tolerated by the serving sector. The amount of interference that can be tolerated by the serving sector is a function of one or more device requirements, traffic occurring in the serving sector, predicted scheduling information, or combinations thereof. In accordance with some aspects, the amount of interference that can be tolerated by the serving sector is indicated by a dynamic IoT setpoint that is based on instantaneous load information in the serving sector. Logical grouping 1302 also includes an electrical component 1306 for measuring an amount of interference experienced by the serving sector.

An electrical component 1308 for determining an interference indicator can be set to a fast up indicator (Up+) is also included in logical grouping 1302. The fast up indicator allows a transmit power of devices in the one or more adjacent sectors to be based on instantaneous load information in the serving sector.

Further, logical grouping 1302 includes an electrical component 1310 for transmitting an OSIB channel that includes the fast up indicator to devices in one or more adjacent sectors. The OSIB channel can be transmitted over a backhaul channel or over the air.

Additionally, wireless communications apparatus 1300 can include a memory 1312 that retains instructions for executing functions associated with electrical components 1304, 1306, 1308, and 1310 or other components. While shown as being external to memory 1312, it is to be understood that one or more of electrical components 1304, 1306, 1308, and 1310 may exist within memory 1312.

Figure 14:
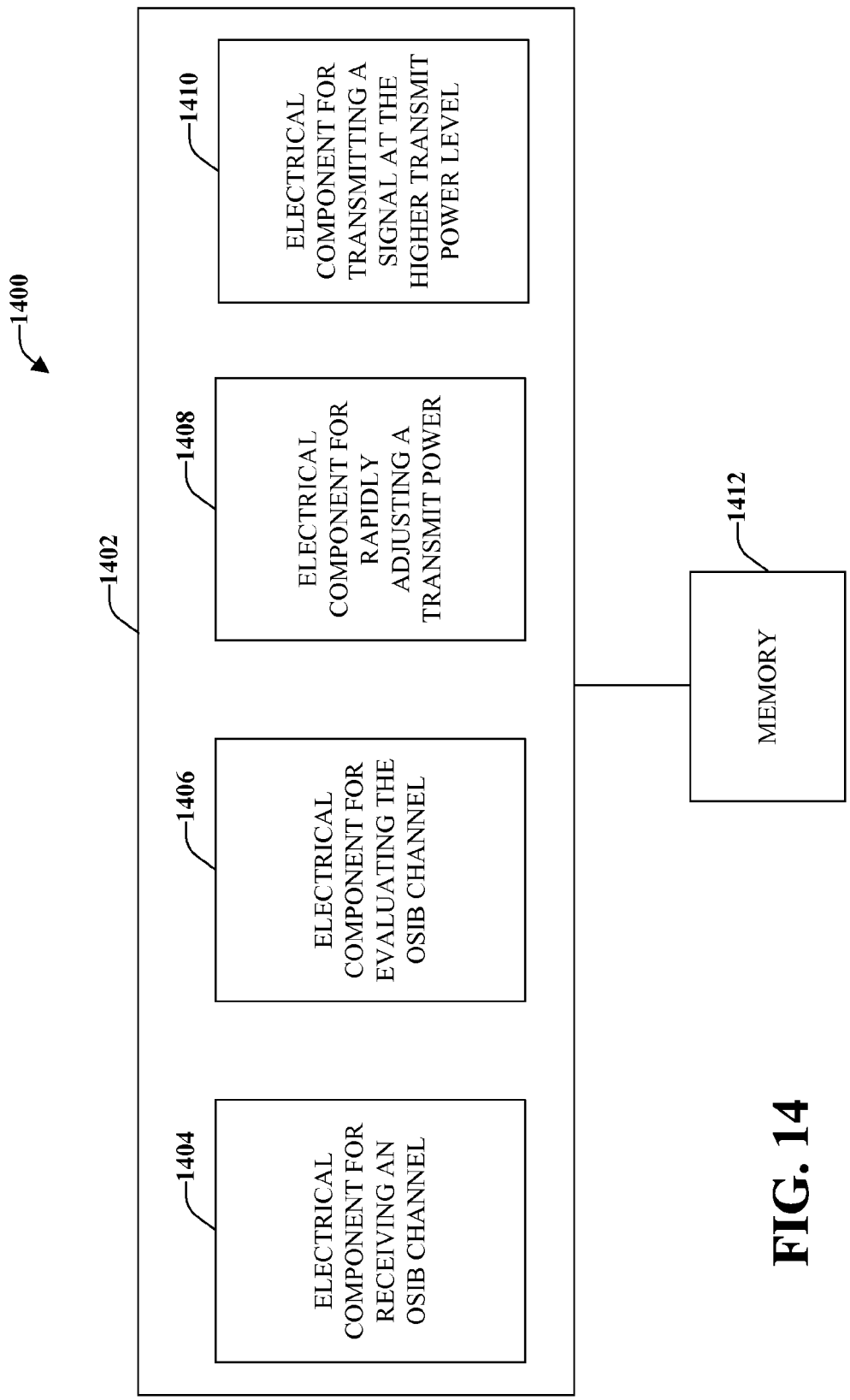
FIG. 14 illustrates an example wireless communications apparatus that manages reverse link interference.

FIG. 14 illustrates an example wireless communications apparatus 1400 that manages reverse link interference. Wireless communications apparatus 1400 is represented as including functional blocks, which may be functional blocks that represent functions implemented by a processor, software, or combination thereof (e.g., firmware).

Wireless communications apparatus 1400 includes a logical grouping 1402 of electrical components that can act separately or in conjunction. Logical grouping 1402 may include an electrical component 1404 for receiving an OSIB channel over the air from a base station in an adjacent sector or from a serving base station that received the OSIB channel over a backhaul. Also included is an electrical component 1406 for evaluating the OSIB channel to determine if a fast up indication bit in the channel is set and an electrical component 1408 for rapidly adjusting a transmit power to a higher level if the fast up indication bit is set. Further, logical grouping 1402 includes an electrical component 1410 for transmitting a signal using the higher transmit power level.

Additionally, wireless communications apparatus 1400 can include a memory 1412 that retains instructions for executing functions associated with electrical components 1404, 1406, 1408, and 1410 or other components. While shown as being external to memory 1412, it is to be understood that one or more of electrical components 1404, 1406, 1408, and 1410 may exist within memory 1412.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

What is claimed is:

1. A method for controlling reverse link interference with a dynamic interference setpoint, comprising:
   determining a number of mobile devices served by a serving sector;
   establishing an interference setpoint associated with the serving sector based at least on the number of mobile devices served by the serving sector and based at least on characteristics of the mobile devices served by the serving sector;
   measuring an interference value that is a function of the amount of reverse link interference experienced by the serving sector;
   determining an action for interference control based on a comparison of the interference setpoint and the interference value, wherein determining the action comprises:
      determining a difference between the interference setpoint and the interference value; and
      selecting an indicator from a first indicator and a second indicator based at least in part on the difference between the interference setpoint and the interference values, wherein:
         the first indicator and a second indicator each indicate that a transmit power of a mobile device can be increased, and
         the transmit power of the mobile device can be increased at a faster rate with the first indicator than with the second indicator;
   communicating the action to one or more mobile devices in a neighboring sector, wherein the action comprises the selected indicator and wherein the action causes the one or more devices in the neighboring sector to adjust a transmit power based at least in part on the selected indicator; and
   subsequent to communicating the action:
      determining a change in the number of mobile devices served by the serving sector,
      establishing another interference setpoint associated with the serving sector based at least on the change in the number of mobile devices served by the serving sector, and
      communicating another action to the one or more mobile devices in the neighboring sector based at least in part on the other interference setpoint.

2. The method of claim 1, wherein communicating the action comprises setting a bit in an other section interference bit (OSIB) channel to indicate the action, wherein the OSIB bit is set based on known future scheduling information of the serving sector.

3. The method of claim 1, wherein communicating the action comprises communicating the action to the neighboring sector over the air.

4. The method of claim 1, wherein communicating the action comprises communicating the action to the neighboring sector over a backhaul channel.

5. The method of claim 1, wherein communicating the action comprises setting a bit in an other section interference bit (OSIB) channel, wherein the OSIB bit is set based on a dynamic interference over thermal (IoT) setpoint with a first indicator.

6. The method of claim 1, wherein the interference setpoint is an interference over thermal (IoT) setpoint and the interference value is an IoT value.

7. A wireless communications apparatus, comprising:
a memory that retains instructions related to:
  determining a number of mobile devices served by a serving sector;
  establishing a dynamic interference setpoint associated with the serving sector based at least on the number of mobile devices served by the serving sector and based at least on characteristics of the mobile devices served by the serving sector,
  calculating an amount of interference received at the serving sector,
  determining an action based on a comparison of the interference setpoint with the amount of received interference, wherein determining the action comprises:
    determining a difference between the interference setpoint and the amount of interference; and
    selecting an indicator from a first indicator and a second indicator based at least in part on the difference between the interference setpoint and the amount of interference, wherein:
      the first indicator and a second indicator each indicate that a transmit power of a mobile device can be increased, and
      the transmit power of the mobile device can be increased at a faster rate with the first indicator than with the second indicator;
  communicating the action to at least one mobile device in a neighboring sector, wherein the action comprises the selected indicator and wherein the action causes the at least one mobile device in the neighboring sector to adjust a transmit power based at least in part on the selected indicator; and
  subsequent to communicating the action:
    determining a change in the number of mobile devices served by the serving sector,
    establishing another interference setpoint associated with the serving sector based at least on the change in the number of mobile devices served by the serving sector, and
    communicating another action to the one or more mobile devices in the neighboring sector based at least in part on the other interference setpoint, and
a processor, coupled to the memory, configured to execute the instructions retained in the memory.

8. The apparatus of claim 7, wherein communicating the action comprises setting an other section interference bit (OSIB) channel bit based on known future scheduling information of the serving sector, wherein the OSIB channel bit indicates the action.

9. The apparatus of claim 7, wherein communicating the action comprises communicating to the at least one device in the neighboring sector over the air or a backhaul channel.

10. The apparatus of claim 7, wherein communicating the action comprises setting a bit in an other section interference bit (OSIB) channel, wherein the OSIB bit is set based on a dynamic interference over thermal (IoT) setpoint with a first indicator.

11. The apparatus of claim 7, wherein the dynamic interference setpoint is an interference over thermal (IoT) setpoint and the amount of interference received is represented as an IoT value.

12. A wireless communications apparatus that controls reverse link interference, comprising:
means for determining a number of mobile devices served by a serving sector;
means for establishing a dynamic interference setpoint associated with the serving sector based at least on the number of mobile devices served by the serving sector and characteristics of the mobile devices served by the serving sector;
means for calculating an amount of interference received at the serving sector;
means for determining an action based on a comparison of the interference setpoint with the amount of received interference, wherein means for determining the action comprises:
  means for determining a difference between the interference setpoint and the amount of interference, and
  means for selecting an indicator from a first indicator and a second indicator based at least in part on the difference between the interference setpoint and the amount of interference, wherein:
    the first indicator and a second indicator each indicate that a transmit power of a mobile device can be increased, and
    the transmit power of the mobile device can be increased at a faster rate with the first indicator than with the second indicator;
means for communicating the action to a mobile device in a neighboring sector, wherein the action comprises the selected indicator and wherein the action causes the mobile device in the neighboring sector to adjust a transmit power based at least in part on the selected indicator;
means for determining a change in the number of mobile devices served by the serving sector,
means for establishing another interference setpoint associated with the serving sector based at least on the change in the number of mobile devices served by the serving sector, and
means for communicating another action to the mobile device in the neighboring sector based at least in part on the other interference setpoint.

13. The apparatus of claim 12, wherein the means for communicating the action sets at least one bit in an other section interference bit (OSIB) channel to "1" or "0" depending on the determined action.

14. The apparatus of claim 12, wherein the means for determining an action represents the action as a dynamic interference over thermal (IoT) setpoint with a first indicator.

15. A computer program product, comprising:
a non-transitory computer-readable medium comprising:
  a first set of codes for causing a computer to determine a number of mobile devices served by a serving sector;
  a second set of codes for causing a computer to establish a target interference setpoint associated with the serving sector based at least on the number of mobile devices served by the serving sector and characteristics of the mobile devices served by the serving sector;
  a third set of codes for causing the computer to measure an amount of interference experienced by the serving sector, the measured amount of interference is an interference value;
  a fourth set of codes for causing the computer to recommend an action to be taken based on a comparison of the target interference setpoint and the measured amount of interference by causing the computer to:
    determine a difference between the target interference setpoint and the measured amount of interference, and
    select an indicator from a first indicator and a second indicator based at least in part on the comparison between the target interference setpoint and the measured amount of interference, wherein:
the first indicator and a second indicator each indicate that a transmit power of a mobile device can be increased, and
the transmit power of the mobile device can be increased at a faster rate with the first indicator than with the second indicator;
a fifth set of codes for causing the computer to communicate the recommended action to mobile devices in one or more neighboring sectors, wherein:
the communication is over the air or over a backhaul channel,
the recommended action comprises the selected indicator, and
the recommended action causes the mobile devices in the one or more neighboring sectors to adjust a transmit power based at least in part on the selected indicator;
a sixth set of codes for causing the computer to determine a change in the number of mobile devices served by the serving sector,
a seventh set of codes for causing the computer to establish another target interference setpoint associated with the serving sector based at least on the change in the number of mobile devices served by the serving sector, and
an eighth set of codes for causing the computer to communicate another recommended action to the mobile devices in the one or more neighboring sectors based at least in part on the other target interference setpoint.

16. The computer program product of claim 15, wherein the fifth set of codes further causes the computer to set an other section interference bit (OSIB) channel bit based on the recommended action.

17. The computer program product of claim 15, wherein the measured amount of interference is denoted as an interference over thermal (IoT) value and the target interference setpoint is a dynamic IoT setpoint that comprises a down indicator, a up indicator, a fast down indicator, and a fast up indicator, wherein the up indicator and the fast up indicator indicate that a transmit power of the devices in one or more neighboring sectors can be increased, and wherein the transmit power of the devices can be increased at a faster rate with the fast up indicator than with the up indicator.

18. At least one processor configured to control interference in a serving sector, comprising:
a first module for measuring an amount of interference experienced by the serving sector;
a second module for determining a number of mobile devices served by a serving sector;
a third module for establishing a target interference setpoint associated with the serving sector based at least on the number of mobile devices served by the serving sector and characteristics of the mobile devices served by the serving sector;
a fourth module for comparing the measured amount of interference and the target interference setpoint and determining a recommended action to be taken based on the comparison, wherein determining the recommended action comprises:
determining a difference between the target interference setpoint and the measured amount of interference; and
selecting an indicator from a first indicator and a second indicator based at least in part on the comparison between the target interference setpoint and the measured amount of interference, wherein:
the first indicator and a second indicator each indicate that a transmit power of a mobile device can be increased, and
the transmit power of the mobile device can be increased at a faster rate with the first indicator than with the second indicator;
a fifth module for setting a bit in an other section interference bit (OSIB) channel to indicate the recommended action and communicating the OSIB channel to a mobile device in a neighboring sector over the air or over a backhaul channel, wherein the recommended action comprises the selected indicator and wherein the recommended action causes the mobile device in the neighboring sector to adjust a transmit power based at least in part on the selected indicator;
a sixth module for determining a change in the number of mobile devices served by the serving sector;
a seventh module for establishing another target interference setpoint associated with the serving sector based at least on the change in the number of mobile devices served by the serving sector; and
an eighth module for communicating another recommended action to the mobile device in the neighboring sector based at least in part on the other target interference setpoint.

19. The at least one processor of claim 18, wherein the target interference setpoint is a dynamic interference over thermal (IoT) setpoint and the measured interference value is an IoT value.

20. A method for controlling reverse link interference in a wireless communications environment, comprising:
determining a number of mobile devices served by a serving sector;
evaluating serving sector information and an amount of reverse link interference tolerable to the serving sector, wherein a setpoint associated with the serving sector is established based on the amount of reverse link interference tolerable to the serving sector and based at least on the number of mobile devices served by the serving sector and characteristics of the mobile devices served by the serving sector;
calculating an amount of interference experienced in the serving sector;
determining a difference between the setpoint and the amount of interference;
determining an interference indicator can be set to a first indicator based on the difference of the setpoint and the amount of interference, wherein:
the first indicator and a second indicator each indicate that a transmit power of one or more devices in an adjacent sector can be increased, and
the transmit power of the one or more devices can be increased at a faster rate with the first indicator than with the second indicator; and
transmitting an other section interference bit (OSIB) channel to the one or more mobile devices in the adjacent sector, wherein the OSIB channel includes the first indicator and causes the one or more devices in the adjacent sector to adjust the transmit power based at least in part on the interference indicator;
determining a change in the number of mobile devices served by the serving sector,
establishing another setpoint associated with the serving sector based at least on the change in the number of mobile devices served by the serving sector, and transmitting another OSIB channel to the one or more mobile devices in the adjacent sector based at least in part on the other setpoint.

21. The method of claim 20, wherein the tolerable amount of reverse link interference is a function of at least one of requirements of one or more devices within the serving sector, traffic requirements occurring in the serving sector, known scheduling information, or combinations thereof.

22. The method of claim 20, wherein the OSIB channel is transmitted over the air or over a backhaul channel.

23. The method of claim 20, wherein the amount of reverse link interference tolerable to the serving sector is a dynamic interference over thermal (IoT) setpoint.

24. A wireless communications apparatus, comprising:
a memory that retains instructions related to:
determining a number of mobile devices served by a serving sector;
evaluating a serving sector and an amount of interference that can be tolerated by the serving sector, wherein a setpoint associated with the serving sector is established based on the amount of interference that can be tolerated by the serving sector and based at least on the number of mobile devices served by the service sector and characteristics of the mobile devices served by the serving sector,
measuring an amount of interference experienced by the serving sector,
determining a difference between the setpoint and the amount of interference;
determining an interference indicator can be set to a first indicator based on the difference between the setpoint and the amount of interference, wherein the first indicator and a second indicator each indicate that a transmit power of at least one device in one or more adjacent sectors can be increased, and wherein the transmit power of the at least one device can be increased at a faster rate with the first indicator than with the second indicator,
transmitting an other section interference bit (OSIB) channel that includes the first indicator to the one or more adjacent sectors and causes at least one mobile device in the one or more adjacent sectors to adjust the transmit power based at least in part on the interference indicator;
determining a change in the number of mobile devices served by the serving sector,
establishing another setpoint associated with the serving sector based at least on the change in the number of mobile devices served by the serving sector, and
transmitting another OSIB channel to the at least one mobile device in the one or more adjacent sectors based at least in part on the other setpoint; and
a processor, coupled to the memory, configured to execute the instructions retained in the memory.

25. The wireless communications apparatus of claim 24, wherein the amount of interference that can be tolerated by the serving sector is a function of traffic requirements occurring in the serving sector, known scheduling information, requirements of one or more devices in the serving sector, or combinations thereof.

26. The wireless communications apparatus of claim 24, wherein the first indicators notifies devices in the one or more adjacent sectors that a transmit power can be increased at a fast rate.

27. The wireless communications apparatus of claim 24, wherein the OSIB channel is transmitted over the air or over a backhaul channel.

28. The wireless communications apparatus of claim 24, wherein the amount of interference that can be tolerated by the serving sector is represented as a dynamic interference over thermal (IoT) setpoint.

29. A wireless communications apparatus that controls reverse link interference, comprising:
means for determining a number of mobile devices served by a serving sector;
means for evaluating the serving sector and an amount of interference that can be tolerated by the serving sector, wherein a setpoint is established based on the amount of interference that can be tolerated by the serving sector and based at least on the number of mobile devices served by the service sector and characteristics of the mobile devices served by the serving sector;
means for measuring an amount of interference experienced by the serving sector;
means for determining a difference between the setpoint and the amount of interference;
means for determining an interference indicator can be set to a first indicator based on the difference between the setpoint and the amount of interference, wherein the first indicator and a second indicator each indicate that a transmit power of devices in one or more adjacent sectors can be increased, and wherein the transmit power of the devices can be increased at a faster rate with the first indicator than with the second indicator; and
means for transmitting an other section interference bit (OSIB) channel to the devices in one or more adjacent sectors, wherein the OSIB channel comprises the first indicator and causes the devices in the one or more adjacent sectors to adjust the transmit power based at least in part on interference indicator;
means for determining a change in the number of mobile devices served by the serving sector,
means for establishing another setpoint associated with the serving sector based at least on the change in the number of mobile devices served by the serving sector, and
means for transmitting another OSIB channel to the devices in the one or more adjacent sectors based at least in part on the other setpoint.

30. The wireless communications apparatus of claim 29, wherein the amount of interference that can be tolerated by the serving sector is a function of one or more device requirements, traffic occurring in the serving sector, predicted scheduling information, or combinations thereof.

31. The wireless communications apparatus of claim 29, wherein the OSIB channel is transmitted over a backhaul channel or over the air.

32. The wireless communications apparatus of claim 29, wherein the amount of interference that can be tolerated by the serving sector is indicated by a dynamic interference over thermal (IoT) setpoint.

33. A computer program product, comprising:
a non-transitory computer-readable medium comprising:
a first set of codes for causing a computer to determine a number of mobile devices served by a serving sector;
a second set of codes for causing the computer to calculate an amount of interference received by the serving sector;
a third set of codes for causing the computer to evaluate the serving sector and an amount of interference that the serving sector can tolerate, wherein a setpoint associated with the serving sector is established based on the amount of interference that the serving sector can tolerate and based at least on the number of mobile devices served by the serving sector and characteristics of the mobile devices served by the serving sector;

a fourth set of codes for causing the computer to determine a difference between the setpoint and the amount of interference;

a fifth set of codes for causing the computer to determine a first indicator can be set based on the difference between the setpoint and the amount of interference, wherein the first indicator and a second indicator each indicate that a transmit power of at least one device in an adjacent sector can be increased, and wherein the transmit power of the at least one device can be increased at a faster rate with the first indicator than with the second indicator; and a sixth set of codes for causing the computer to transmit an other section interference bit (OSIB) channel that includes the first indicator and causes the at least one device in the adjacent sector to adjust the transmit power based at least in part on the first indicator, the transmission occurs over the air or over a backhaul channel;

a seventh set of codes for causing the computer to determine a change in the number of mobile devices served by the serving sector;

an eighth set of codes for causing the computer to establish another setpoint associated with the serving sector based at least on the change in the number of mobile devices served by the serving sector, and a ninth set of codes for causing the computer to transmit another OSIB channel to the at least one device in the adjacent sector based at least in part on the other setpoint.

34. The computer program product of claim 33, wherein the amount of interference that the serving sector can tolerate is denoted as a dynamic interference over thermal (IoT) setpoint.

35. At least one processor configured to control reverse link interference, comprising:

a first module for determining a number of mobile devices served by a serving sector;

a second module for evaluating information associated with the serving sector and an amount of interference that can be tolerated, wherein a setpoint is established based on the amount of interference that can be tolerated and based at least on the number of mobile devices served by the serving sector and characteristics of the mobile devices served by the serving sector;

a third module for calculating an amount of interference experienced by the serving sector;

a fourth module for determining a difference between the setpoint and the amount of interference;

a fifth module for determining a bit in an other section interference bit (OSIB) channel can be set to a first indicator based on the difference between the setpoint and the amount of interference, wherein the first indicator and a second indicator indicate that a transmit power of one or more devices in an adjacent sector can be increased, and wherein the transmit power of the one or more devices can be increased at a faster rate with the first indicator than with the second indicator;

a sixth module for transmitting the OSIB channel to the adjacent sector over the air or over a backhaul, wherein the OSIB channel comprises the first indicator and causes the one or more devices in the adjacent sector to adjust the transmit power based at least in part on the first indicator;

a seventh module for determining a change in the number of mobile devices served by the serving sector, a eighth module for establishing another setpoint associated with the serving sector based at least on the change in the number of mobile devices served by the serving sector, and a ninth module for transmitting another OSIB channel to the adjacent sector based at least in part on the other setpoint.

36. The at least one processor of claim 35, wherein the amount of interference that can be tolerated is a function of at least one of requirements of one or more devices within the serving sector, traffic requirements occurring in the serving sector, known scheduling information, or combinations thereof.

* * * * *